US012627442B2

(12) United States Patent
Abdelghaffar et al.

(10) Patent No.: US 12,627,442 B2
(45) Date of Patent: May 12, 2026

(54) DEMODULATION REFERENCE SIGNAL RESOURCE ALLOCATION

(71) Applicant: QUALCOMM Incorporated, San Diego, CA (US)

(72) Inventors: Muhammad Sayed Khairy Abdelghaffar, San Jose, CA (US); Yi Huang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 18/183,343

(22) Filed: Mar. 14, 2023

(65) Prior Publication Data

US 2023/0353315 A1     Nov. 2, 2023

Related U.S. Application Data

(60) Provisional application No. 63/363,849, filed on Apr. 29, 2022.

(51) Int. Cl.
*H04L 5/00*          (2006.01)
*H04L 27/26*        (2006.01)

(52) U.S. Cl.
CPC ...... *H04L 5/0051* (2013.01); *H04L 27/26035* (2021.01)

(58) Field of Classification Search
None
See application file for complete search history.

(56) References Cited

U.S. PATENT DOCUMENTS

2012/0300709 A1* 11/2012 Su ......................... H04L 1/1893
                                                                    370/328
2013/0064216 A1*  3/2013 Gao ...................... H04L 5/0055
                                                                    370/329

(Continued)

FOREIGN PATENT DOCUMENTS

WO      WO-2023031794 A1     3/2023

OTHER PUBLICATIONS

International Search Report and Written Opinion—PCT/US2023/064440—ISA/EPO—Sep. 4, 2023.

(Continued)

*Primary Examiner* — Otis L Thompson, Jr.
(74) *Attorney, Agent, or Firm* — QUALCOMM Incorporated

(57)                    ABSTRACT

Various aspects of the present disclosure generally relate to wireless communication. In some aspects, a user equipment (UE) may transmit, to a network entity, demodulation reference signal (DMRS) capability information that indicates a number of orthogonal DMRS ports for DMRS communications. The UE may receive, from the network entity, information that is associated with a DMRS port mapping for the number of orthogonal DMRS ports and that indicates to restrict a resource allocation for a physical downlink shared channel (PDSCH) or physical uplink shared channel (PUSCH) to an integer that is a multiple of two for each contiguous physical resource block, to restrict a virtual resource block to physical resource block (VRB-to-PRB) mapping, or to restrict the number of orthogonal DMRS ports such that a legacy number of DMRS ports and an extended number of DMRS ports are not multiplexed in a same code division multiplexing (CDM) group. Numerous other aspects are described.

30 Claims, 17 Drawing Sheets

(56) References Cited

U.S. PATENT DOCUMENTS

| | | | |
|---|---|---|---|
| 2013/0343340 A1 | 12/2013 | Seo et al. | |
| 2014/0105057 A1* | 4/2014 | Liu | H04L 43/12 |
| | | | 370/252 |
| 2016/0036542 A1* | 2/2016 | Gong | H04W 24/10 |
| | | | 370/329 |
| 2016/0227521 A1* | 8/2016 | Han | H04W 72/0453 |
| 2017/0078006 A1 | 3/2017 | Liu et al. | |
| 2019/0068308 A1* | 2/2019 | Shin | H04L 5/0023 |
| 2020/0022122 A1* | 1/2020 | Wu | H04W 72/23 |
| 2020/0084732 A1* | 3/2020 | Liu | H04W 52/14 |
| 2020/0106566 A1* | 4/2020 | Yeo | H04L 1/1812 |
| 2020/0228225 A1* | 7/2020 | Bhamri | H04L 5/0051 |
| 2020/0382252 A1* | 12/2020 | Sun | H04B 7/0626 |
| 2021/0037516 A1* | 2/2021 | Lyu | H04L 1/1864 |
| 2021/0091902 A1* | 3/2021 | Yamada | H04B 7/0617 |
| 2021/0105117 A1 | 4/2021 | Abdelghaffar et al. | |
| 2021/0135922 A1* | 5/2021 | Gao | H04L 5/0023 |
| 2021/0204260 A1* | 7/2021 | Liu | H04L 5/0053 |
| 2022/0006581 A1* | 1/2022 | Yamada | H04W 72/23 |
| 2022/0021499 A1* | 1/2022 | Jiang | H04L 5/0048 |
| 2022/0085929 A1* | 3/2022 | Ren | H04L 5/0051 |
| 2022/0416961 A1* | 12/2022 | Frenne | H04L 5/0026 |

OTHER PUBLICATIONS

Partial International Search Report—PCT/US2023/064440—ISA/
EPO—Jun. 23, 2023.

* cited by examiner

Configuration Type-1 with 1 Symbol

Configuration Type-2 with 1 Symbol

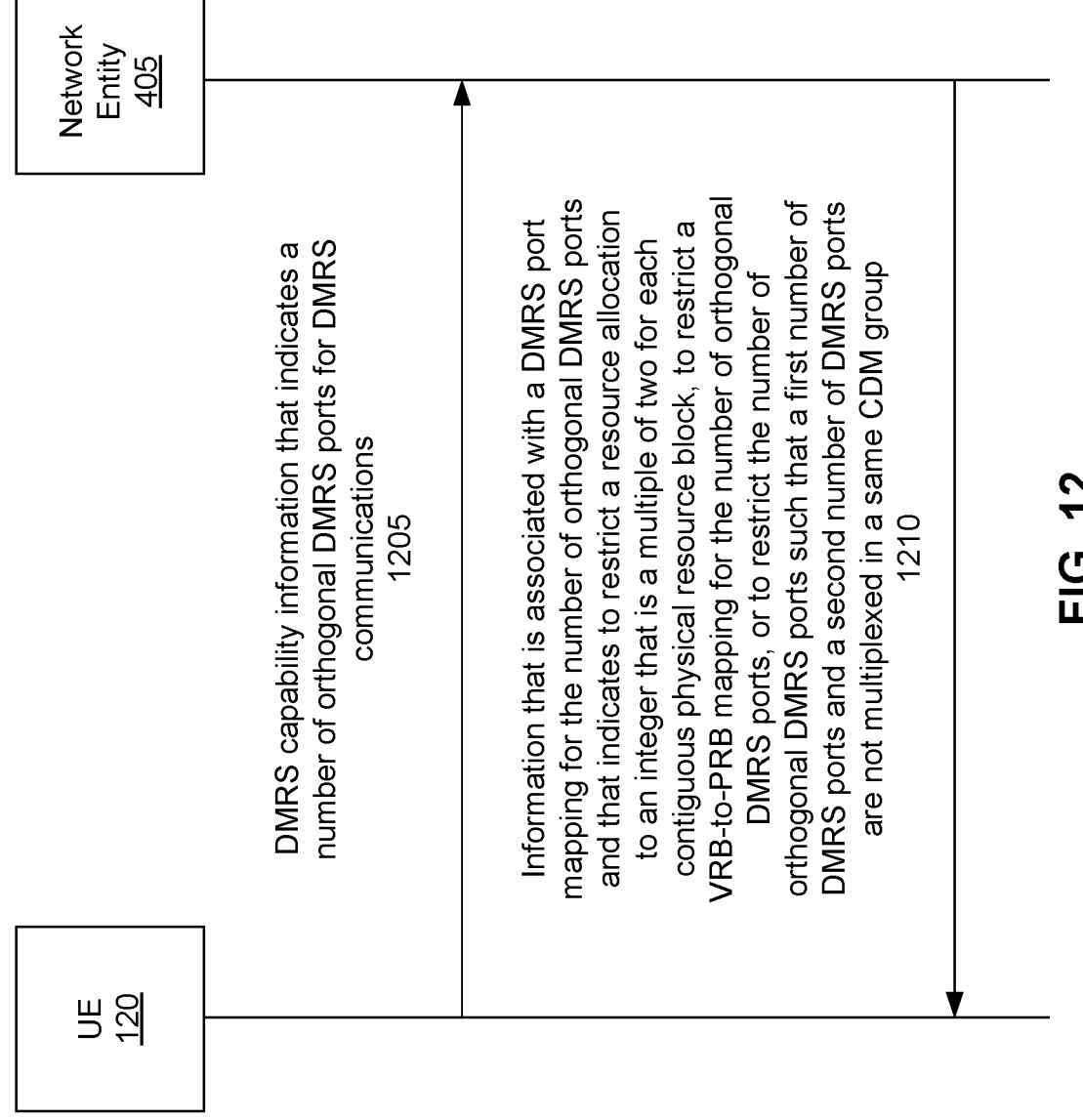

Network Entity 405

UE 120

DMRS capability information that indicates a number of orthogonal DMRS ports for DMRS communications
1205

Information that is associated with a DMRS port mapping for the number of orthogonal DMRS ports and that indicates to restrict a resource allocation to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group
1210

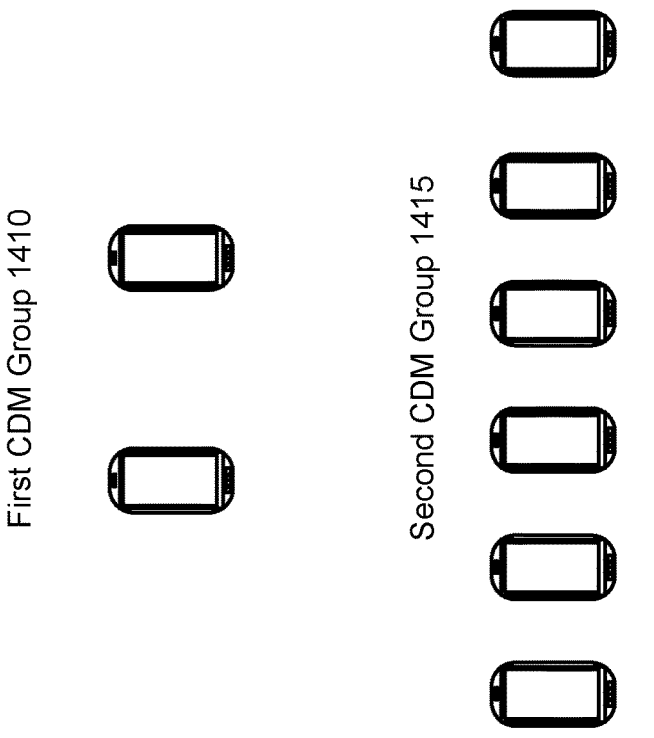
First CDM Group 1410
Second CDM Group 1415
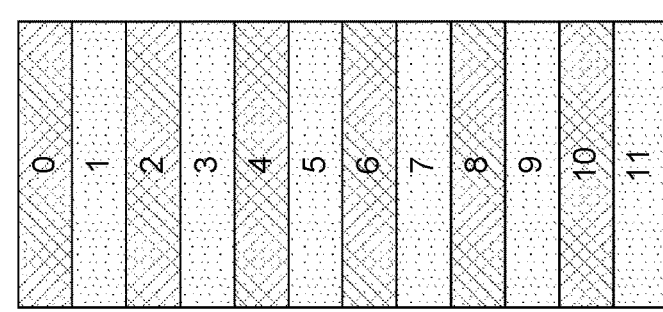
Resource Elements 1405
1400
FIG. 14

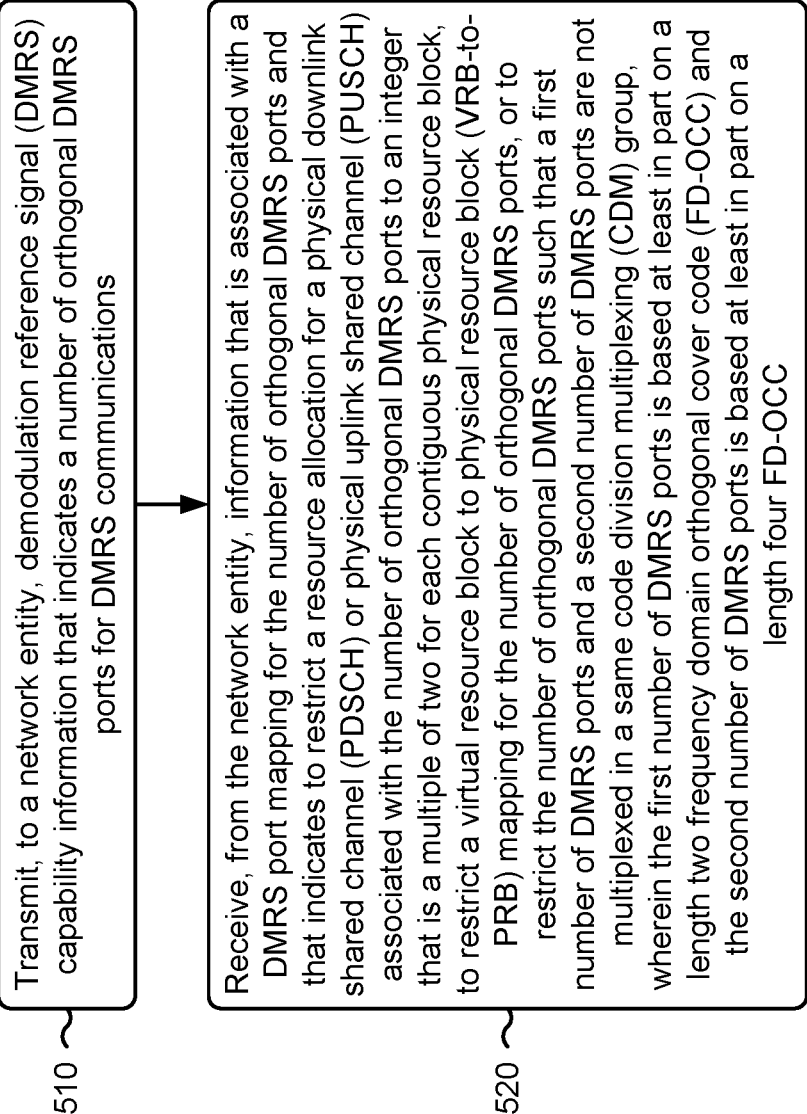

1510 — Transmit, to a network entity, demodulation reference signal (DMRS) capability information that indicates a number of orthogonal DMRS ports for DMRS communications 1520 — Receive, from the network entity, information that is associated with a DMRS port mapping for the number of orthogonal DMRS ports and that indicates to restrict a resource allocation for a physical downlink shared channel (PDSCH) or physical uplink shared channel (PUSCH) associated with the number of orthogonal DMRS ports to an integer that is a multiple of two for each contiguous physical resource block, to restrict a virtual resource block to physical resource block (VRB-to-PRB) mapping for the number of orthogonal DMRS ports, or to restrict the number of orthogonal DMRS ports such that a first number of DMRS ports and a second number of DMRS ports are not multiplexed in a same code division multiplexing (CDM) group, wherein the first number of DMRS ports is based at least in part on a length two frequency domain orthogonal cover code (FD-OCC) and the second number of DMRS ports is based at least in part on a length four FD-OCC

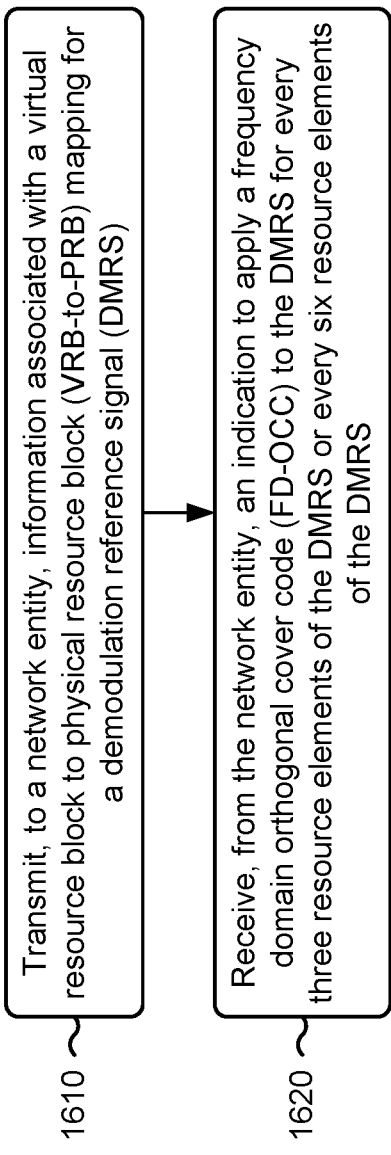

1610 Transmit, to a network entity, information associated with a virtual resource block to physical resource block (VRB-to-PRB) mapping for a demodulation reference signal (DMRS)

1620 Receive, from the network entity, an indication to apply a frequency domain orthogonal cover code (FD-OCC) to the DMRS for every three resource elements of the DMRS or every six resource elements of the DMRS

DEMODULATION REFERENCE SIGNAL RESOURCE ALLOCATION

CROSS-REFERENCE TO RELATED APPLICATION

This Patent Application claims priority to U.S. Provisional Patent Application No. 63/363,849, filed on Apr. 29, 2022, entitled "DEMODULATION REFERENCE SIGNAL RESOURCE ALLOCATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal resource allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a network entity, demodulation reference signal (DMRS) capability information that indicates a number of orthogonal DMRS ports for DMRS communications. The method may include receiving, from the network entity, information that is associated with a DMRS port mapping for the number of orthogonal DMRS ports and that indicates to restrict a resource allocation for a physical downlink shared channel (PDSCH) or physical uplink shared channel (PUSCH) associated with the number of orthogonal DMRS ports to an integer that is a multiple of two for each contiguous physical resource block, to restrict a virtual resource block to physical resource block (VRB-to-PRB) mapping for the number of orthogonal DMRS ports, or to restrict the number of orthogonal DMRS ports such that a first number of DMRS ports and a second number of DMRS ports are not multiplexed in a same code division multiplexing (CDM) group, wherein the first number of DMRS ports is based at least in part on a length two frequency domain orthogonal cover code (FD-OCC) and the second number of DMRS ports is based at least in part on a length four FD-OCC.

Some aspects described herein relate to a method of wireless communication performed by a UE. The method may include transmitting, to a network entity, information associated with a VRB-to-PRB mapping for a DMRS. The method may include receiving, from the network entity, an indication to apply a FD-OCC to the DMRS for every three resource elements of the DMRS or every six resource elements of the DMRS.

Some aspects described herein relate to an apparatus for wireless communication performed by a UE. The apparatus may include a memory and one or more processors, coupled to the memory. The one or more processors may be configured to transmit, to a network entity, DMRS capability information that indicates a number of orthogonal DMRS ports for DMRS communications. The one or more processors may be configured to receive, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two frequency domain orthogonal cover code (FD-OCC) and the second number of DMRS ports is based at least in part on a length four FD-OCC.

Some aspects described herein relate to an apparatus for wireless communication performed by a UE. The apparatus may include a memory and one or more processors, coupled to the memory. The one or more processors may be configured to transmit, to a network entity, information associated with a VRB-to-PRB mapping for a DMRS. The one or more processors may be configured to receive, from the network entity, an indication to apply a FD-OCC to the DMRS for every three resource elements of the DMRS or every six resource elements of the DMRS.

Some aspects described herein relate to a non-transitory computer-readable medium that stores a set of instructions for wireless communication by a UE. The set of instructions, when executed by one or more processors of the UE, may cause the UE to transmit, to a network entity, DMRS capability information that indicates a number of orthogonal DMRS ports for DMRS communications. The set of instructions, when executed by one or more processors of the UE, may cause the UE to receive, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC.

Some aspects described herein relate to a non-transitory computer-readable medium that stores a set of instructions for wireless communication by a UE. The set of instructions, when executed by one or more processors of the UE, may cause the UE to transmit, to a network entity, information associated with a VRB-to-PRB mapping for a DMRS. The set of instructions, when executed by one or more processors of the UE, may cause the UE to receive, from the network entity, an indication to apply a FD-OCC to the DMRS for every three resource elements of the DMRS or every six resource elements of the DMRS.

Some aspects described herein relate to an apparatus for wireless communication. The apparatus may include means for transmitting, to a network entity, DMRS capability information that indicates a number of orthogonal DMRS ports for DMRS communications. The apparatus may include means for receiving, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC.

Some aspects described herein relate to an apparatus for wireless communication. The apparatus may include means for transmitting, to a network entity, information associated with a VRB-to-PRB mapping for a DMRS. The apparatus may include means for receiving, from the network entity, an indication to apply a FD-OCC to the DMRS for every three resource elements of the DMRS or every six resource elements of the DMRS.

Aspects generally include a method, apparatus, system, computer program product, non-transitory computer-readable medium, user equipment, base station, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 12 is a diagram illustrating an example associated with DMRS resource allocation, in accordance with the present disclosure.

FIG. 14 is a diagram illustrating an example associated with DMRS resource allocation, in accordance with the present disclosure.

FIG. 15 is a diagram illustrating an example process associated with DMRS resource allocation, in accordance with the present disclosure.

FIG. 16 is a diagram illustrating an example process associated with DMRS resource allocation, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
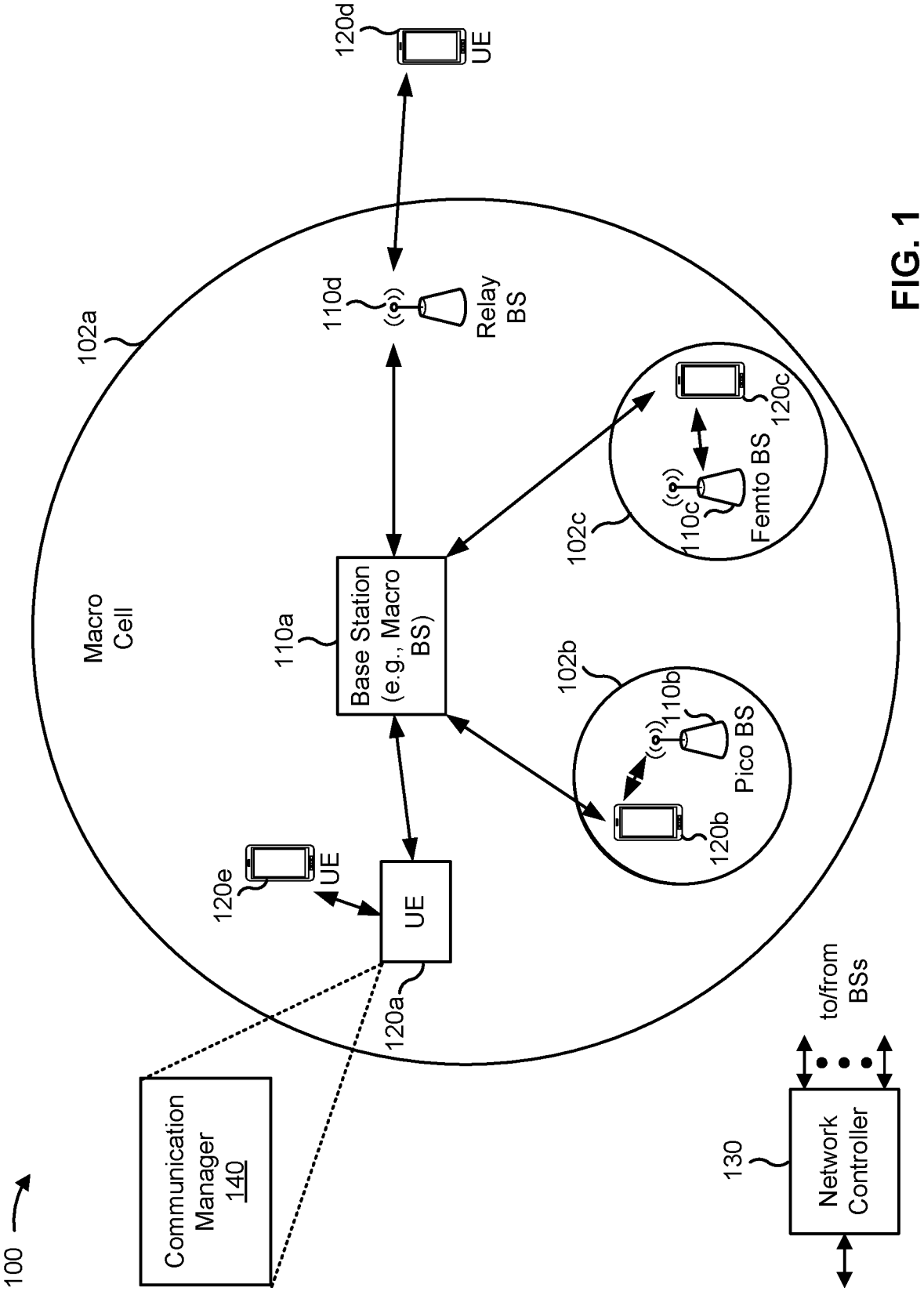
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations 1-R1 (410 MHz-7.125 GHz) and 1-R2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5 G NR studies have identified an operating band for these mid-band frequencies as frequency range designation FR3 (7.125 GHz-24.25 GHz). Frequency bands falling within FR3 may inherit 1-R1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), 1-R4 (52.6 GHz-114.25 GHz), and 1-R5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network entity, demodulation reference signal (DMRS) capability information that indicates a number of orthogonal DMRS ports for DMRS communications; and receive, from the network entity, information that is associated with a DMRS port mapping for the number of orthogonal DMRS ports and that indicates to restrict a resource allocation for a physical downlink shared channel (PDSCH) or physical uplink shared channel (PUSCH) associated with the number of orthogonal DMRS ports to an integer that is a multiple of two for each contiguous physical resource block, to restrict a virtual resource block to physical resource block (VRB-to-PRB) mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC. Additionally, or alternatively, the communication manager 140 may perform one or more other operations described herein.

In some aspects, the communication manager 140 may transmit, to a network entity, information associated with a VRB-to-PRB mapping for a DMRS; and receive, from the network entity, an indication to apply a frequency domain orthogonal cover code (FD-OCC) to the DMRS for every three resource elements of the DMRS or every six resource elements of the DMRS. Additionally, or alternatively, the communication manager 140 may perform one or more other operations described herein.

As indicated above, FIG. 1 is provided as an example. Other examples may differ from what is described with regard to FIG. 1.

Figure 2:
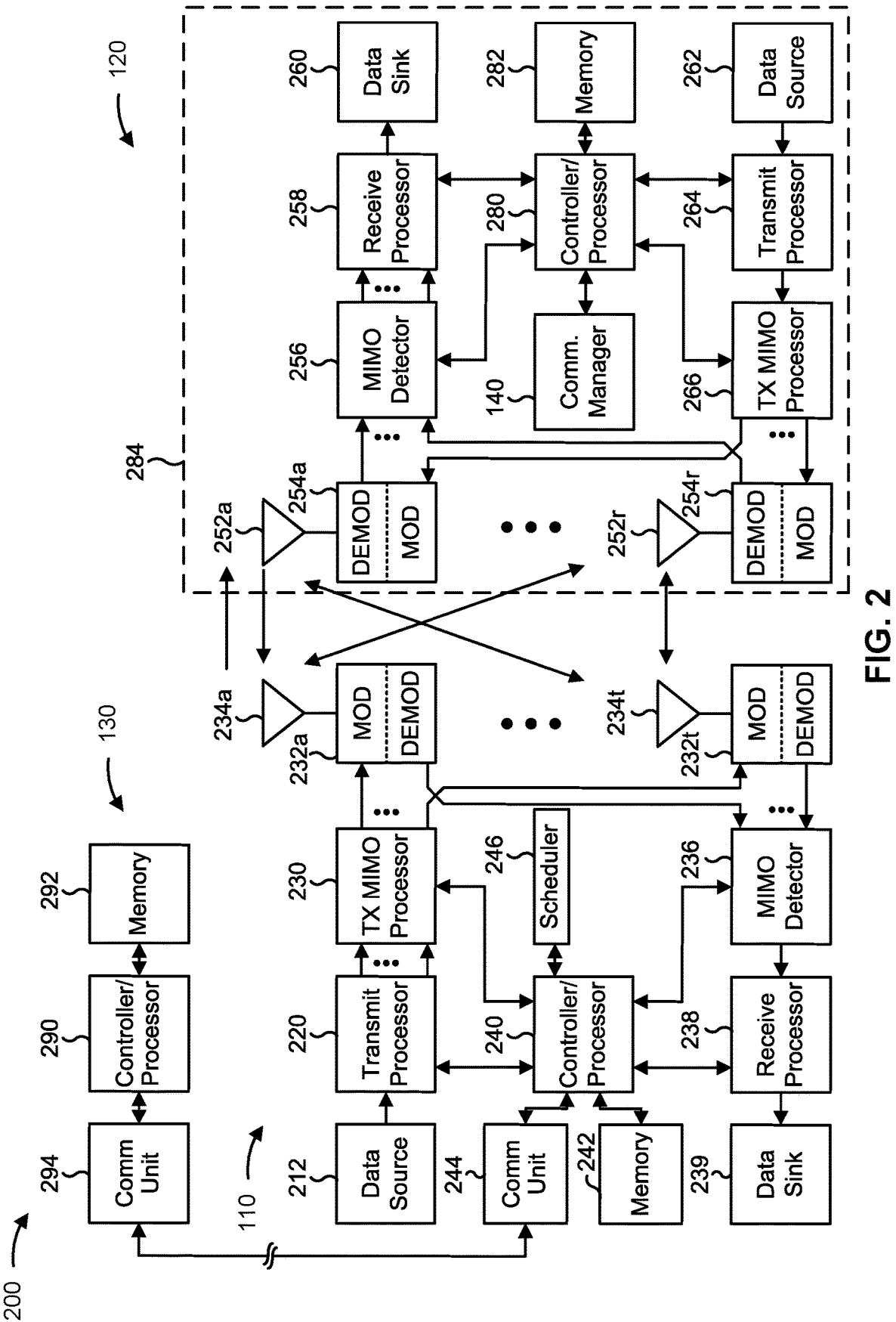
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)).

A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 12-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 12-17).

The controller/processor 240 of the base station 110, the controller/processor 280 of the UE 120, and/or any other component(s) of FIG. 2 may perform one or more techniques associated with DMRS resource allocation, as described in more detail elsewhere herein. For example, the controller/processor 240 of the base station 110, the controller/processor 280 of the UE 120, and/or any other component(s) of FIG. 2 may perform or direct operations of, for example, process 1500 of FIG. 15, process 1600 of FIG. 16, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, the UE includes means for transmitting, to a network entity, DMRS capability information that indicates a number of orthogonal DMRS ports for DMRS communications; and/or means for receiving, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a virtual resource block to VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for transmitting, to a network entity, information associated with a VRB-to-PRB mapping for a DMRS; and/or means for receiving, from the network entity, an indication to apply a FD-OCC to the DMRS for every three resource elements of the DMRS or every six resource elements of the DMRS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
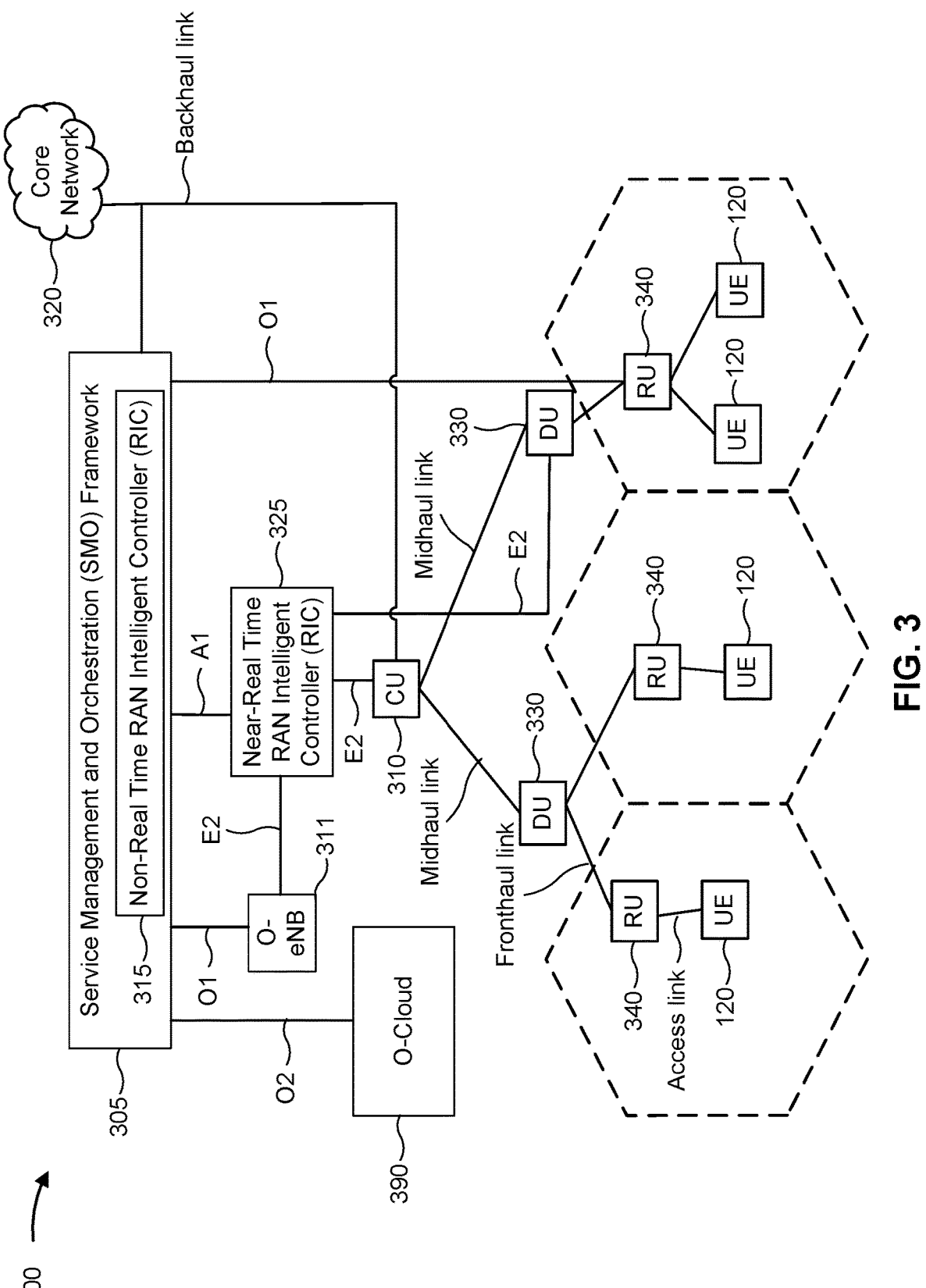
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to the CU, the DU, the RU, the Near-RT RAN Intelligent Controller (RIC), or the non-RT RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station. In some aspects, the network entity (and/or the base station) may transmit information associated with a DMRS port mapping and that indicates to restrict a resource allocation to an integer that is a multiple of two resource blocks or to restrict a VRB to PRB mapping for the number of orthogonal DMRS ports. Additionally, or alternatively, the network entity (and/or the base station) may transmit an indication to apply an FD-OCC to the DMRS for every three resource elements of the DMRS or every six resource elements of the DMRS. Additional details describing these features are provided below.

As indicated above, FIG. 3 is provided as an example. Other examples may differ from what is described with regard to FIG. 3.

Figure 4:
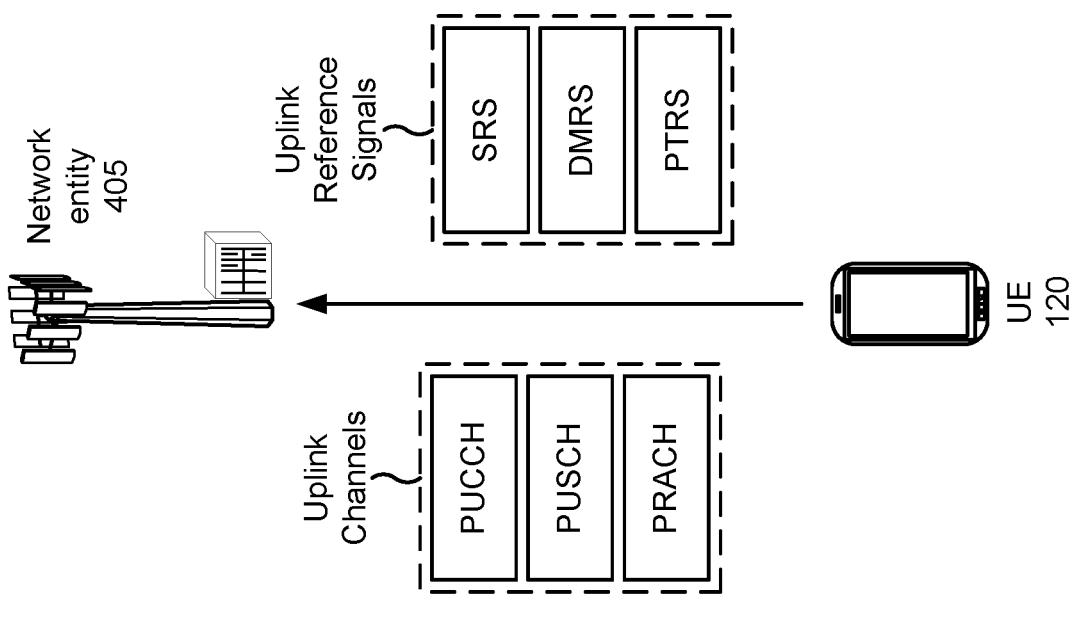
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network entity 405 to the UE 120, and uplink channels and uplink reference signals may carry information from the UE 120 to the network entity 405. The network entity 405 may include some or all of the features of the base station 110, the CU 310, the DU 330, and/or the RU 340.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a PUSCH that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network entity 405 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 405 may configure a set of CSI-RSs for the UE 120, and the UE 120 may measure the configured set of CSI-RSs. Based at least in part on the measurements, the UE 120 may perform channel estimation and may report channel estimation parameters to the network entity 405 (e.g., in a CSI report), such as a CQI, a precoding matrix indicator (PMI), a CSI-RS resource indicator (CRI), a layer indicator (LI), a rank indicator (RI), or an RSRP, among other examples. The network entity 405 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary.

As shown, DMRSs are used for both downlink communications and uplink communications.

In some cases, the UE 120 may use the DMRS to estimate the propagation channel experienced by the PBCH. The resultant information may be used to help demodulate the PBCH and subsequently decode the master information block (MIB). In some examples, the DMRS may occupy 144 resource elements. The resource elements may be interleaved with the resource elements allocated to the PBCH. The combination of the synchronization signals, PBCH and DMRS for the PBCH may form an SS/PBCH block. The SS/PBCH block may occupy four symbols in the time domain and 240 subcarriers in the frequency domain. In some cases, the DMRS itself may be a pseudo-random sequence length of 144. The variables used to initialize the pseudo random sequence may depend upon the operating band. In some cases, the UE 120 may know the physical cell identifier (PCI) at the time of decoding the PBCH but may not always know the other variables (e.g., when completing initial cell selection). In some cases, the UE 120 may need to complete blind decoding attempts to determine these variables.

In some cases, the UE 120 may use the DMRS to estimate the propagation channel experienced by the PDCCH. The resultant information may be used to help demodulate the PDCCH and subsequently decode the DCI. In some cases, the DMRS may occupy twenty five percent (25%) of the resource elements within resource blocks used by the PDCCH. These resource elements may be in fixed positions which do not depend upon the PCI nor any other planning parameter. In some cases, the UE 120 (by default) may assume that the DMRS for the PDCCH is quasi-located with the SS/PBCH block in terms of Doppler shift, Doppler spread, average delay, delay spread, and spatial receive parameters. This may indicate that the PDCCH and the DMRS are beamformed in the same way as the selected SS/PBCH block. In some cases, the DMRS is a pseudo-random sequence which may be initialized using the PCI.

In some cases, the PDSCH is transmitted in combination with the DMRS. The DMRS and PDSCH may be transmitted using the same precoding and antenna ports (e.g., they both experience the same composite propagation channel). The UE 120 may be able to deduce the composite propagation channel by comparing the received DMRS with the transmitted DMRS. In some cases, the DMRS may be transmitted within the set of resource blocks allocated to the PDSCH. For example, if the UE 120 is allowed ten resource blocks for the PDSCH, then both the DMRS and the PDSCH may be transmitted across those ten resource blocks.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 405 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 405 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 405 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 405 may measure the SRSs, may perform channel estimation based at least in part on the measurements, and may use the SRS measurements to configure communications with the UE 120.

In some cases, the UE 120 may receive an indication to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC. Additional details regarding these features are described below.

As indicated above, FIG. 4 is provided as an example. Other examples may differ from what is described with regard to FIG. 4.

Figure 5:
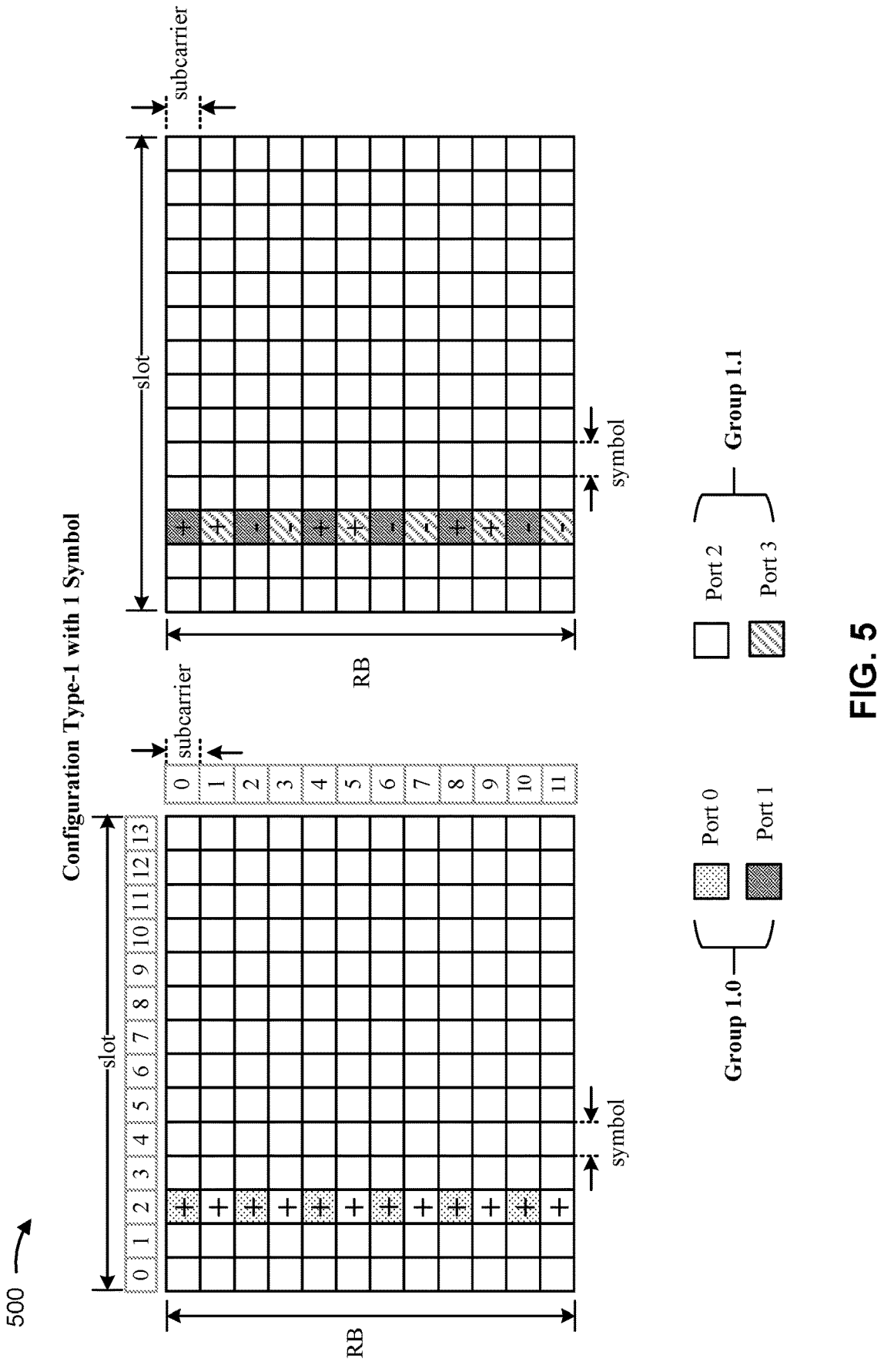
FIG. 5 is a diagram illustrating an example of demodulation reference signal (DMRS) configuration type-1 for one symbol, in accordance with the present disclosure.

FIG. 5 is a diagram illustrating an example 500 of DMRS configuration type-1 for one symbol, in accordance with the present disclosure.

In some cases, a DMRS may be front loaded in a slot, such as coming before data in the slot. The UE 120 may use the DMRS in the slot to estimate a channel before performing reception of the data. A configuration type-1 DMRS using a single symbol may support up to four DMRS ports by applying two FD-OCC and using a two comb frequency offset pattern in which resource elements associated with different DMRS ports alternate along the tones of a resource block (RB) and in which different codes are applied to different groups of DMRS ports.

In some cases, an RB includes twelve tones, and a slot includes fourteen symbols. Each unique combination of one of the twelve tones and one of the fourteen symbols defines a resource element (RE). The first two symbols of a slot may be used for control transmissions, and the first DMRS symbol may follow the symbols reserved for control, for example, the first DMRS symbol may be in symbol 2 of the slot. Data may then be transmitted in the remaining symbols of the slot. Therefore, the DMRS may be considered front loaded because it is transmitted prior to the data in the slot. A single symbol of configuration type-1 may supports up to four DMRS ports, and as such, supports four downlink layers.

The pattern of alternating resource elements for different DMRS ports in may be referred to as a "two comb" frequency offset pattern. For example, symbol 2 may include a portion of a DMRS that alternates between DMRS Port 0 and DMRS Port 2 along the tones (and thus resource elements) of symbol 2. The same time and frequency resources in symbol 2 of the same slot for the same RB may be used to transmit a second portion of the DMRS that similarly alternates between DMRS Port 1 and DMRS Port 3.

In some cases, the ports may be grouped into two groups. For example, group 1.0 includes Port 0 and Port 1, and group 1.1 includes Port 2 and Port 3. The DMRS ports from group 1.0 are both transmitted on the same resource elements, such as tones 0, 2, 4, 6, 8, and 10 of symbol 2. The DMRS for the ports from group 1.1 (Port 0 and Port 1) are both transmitted on the same resource elements, such as tones 1, 3, 5, 7, 9, and 11 of symbol 2. To enable the simultaneous transmission of the DMRS from all of the ports in group 1.0 and group 1.1 using the same time and frequency resources, two different codes may be applied to the ports in the respective groups so that the UE 120 receiving the DMRS may distinguish the DMRS from Port 0 from that from Port 1, and similarly distinguish the DMRS from Port 2 from that from Port 3. In some cases, the first code applied to the resource elements from Port 0 of group 1.0 and from Port 2 of group 1.1 is "+1 +1" code in the frequency domain, meaning that a "+1" code is applied to each of the resource elements from Ports 0 and 2. The second code that is applied to the resource elements from Port 1 of group 1.0 and Port 3 of group 1.1 is "+1 −1" code in the frequency domain, meaning that "+1" and "−1" codes are alternately applied to the resource elements from Port 1 and similarly to the resource elements from Port 3. Therefore, even though the DMRS for the ports in the respective groups are transmitted in the same time and frequency resource, a receiving device can distinguish the different DMRS ports of each group based on the different FD-OCCs applied to the resource elements of the DMRS.

As indicated above, FIG. 5 is provided as an example. Other examples may differ from what is described with regard to FIG. 5.

Figure 6:
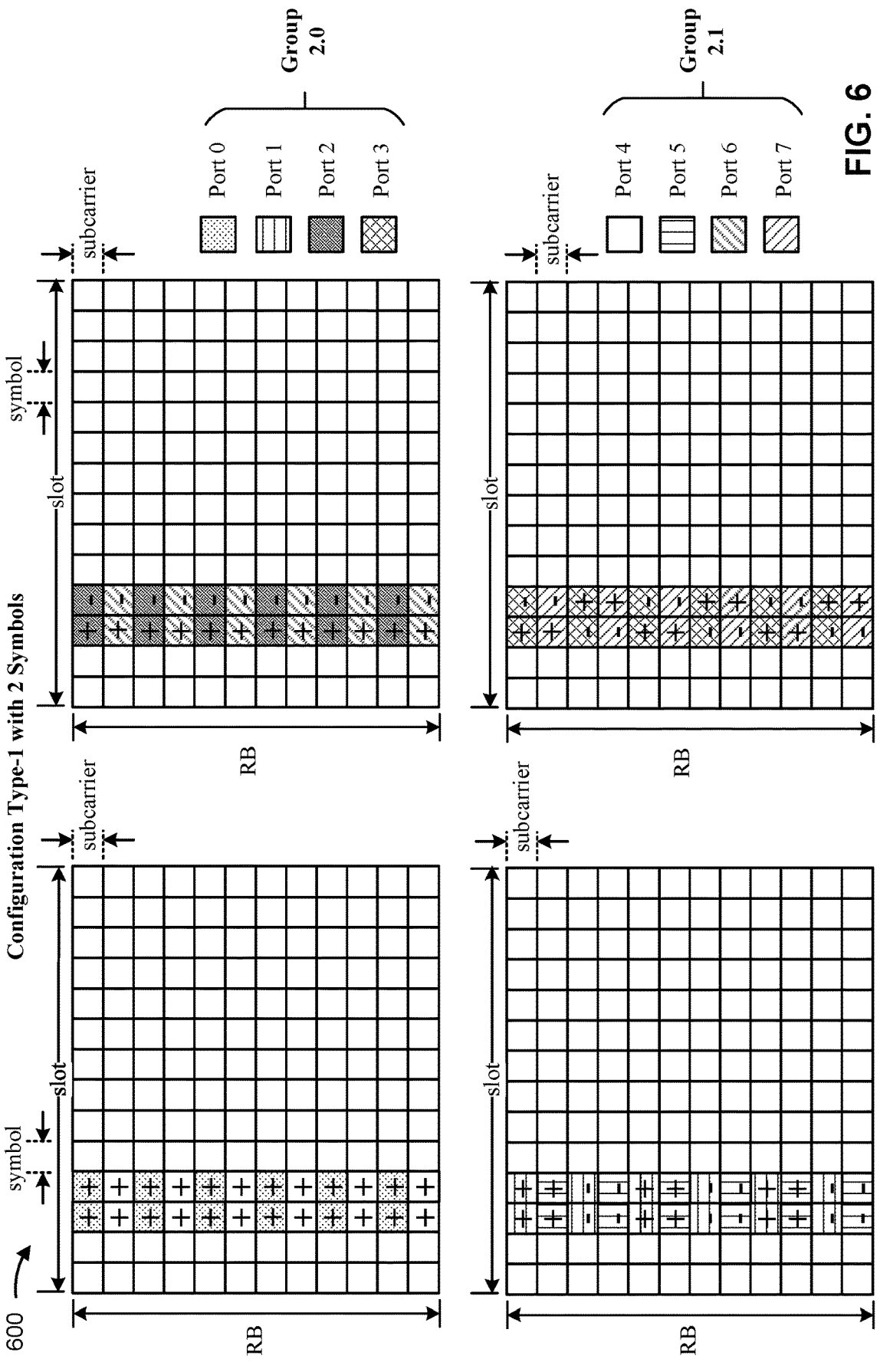
FIG. 6 is a diagram illustrating an example of DMRS configuration type-1 for two symbols, in accordance with the present disclosure.

FIG. 6 is a diagram illustrating an example 600 of DMRS configuration type-1 for two symbols, in accordance with the present disclosure. If the network entity 405 wants to assign more than four layers to the UE 120, the network entity 405 may use more than one symbol to transmit the DMRS. Data may then be transmitted in the remaining symbols of the slot, such as in symbols 4 to 13 of the slot. The addition of the second symbol enables two time-domain orthogonal cover codes (TD-OCC) to be applied to the DMRS. Therefore, the two symbols of configuration type-2 support up to eight DMRS ports. A first group (group 2.0) of the DMRS ports includes Port 0, Port 1, Port 2, and Port 3, and a second group (Group 2.1) includes Port 4, Port 5, Port 6, and Port 7. A two comb pattern of portions of the DMRS for Port 0 from the first group and Port 4 from the second group uses a code of "+1 +1" in the first symbol (symbol 2) and in the second symbol (symbol 3). A two comb pattern of port 1 from the first group and Port 5 from the second group uses a code of "+1 −1" in frequency for both symbol 2 and symbol 3. A two comb pattern of Port 2 and Port 6 use a code of "+1 +1" in frequency for symbol 2 and a code of "−1 −1" in frequency for symbol 3. A two comb pattern of Port 3 and Port 7 uses a code of "+1 −1" in symbol 2 and "−1 +1" in symbol 3. Therefore, the portion of the DMRS for each of the four ports from group 1 that are transmitted using the same time and frequency resources have a different code applied for the combination of the two symbols. The UE 120 receiving the DMRS may distinguish the DMRS from the different ports. Therefore, the configuration type-1 DMRS over two symbols supports DMRS for up to eight ports. The UE 120 that is configured for configuration type-1 over two symbols may receive up to eight downlink layers.

As indicated above, FIG. 6 is provided as an example. Other examples may differ from what is described with regard to FIG. 6.

Figure 7:
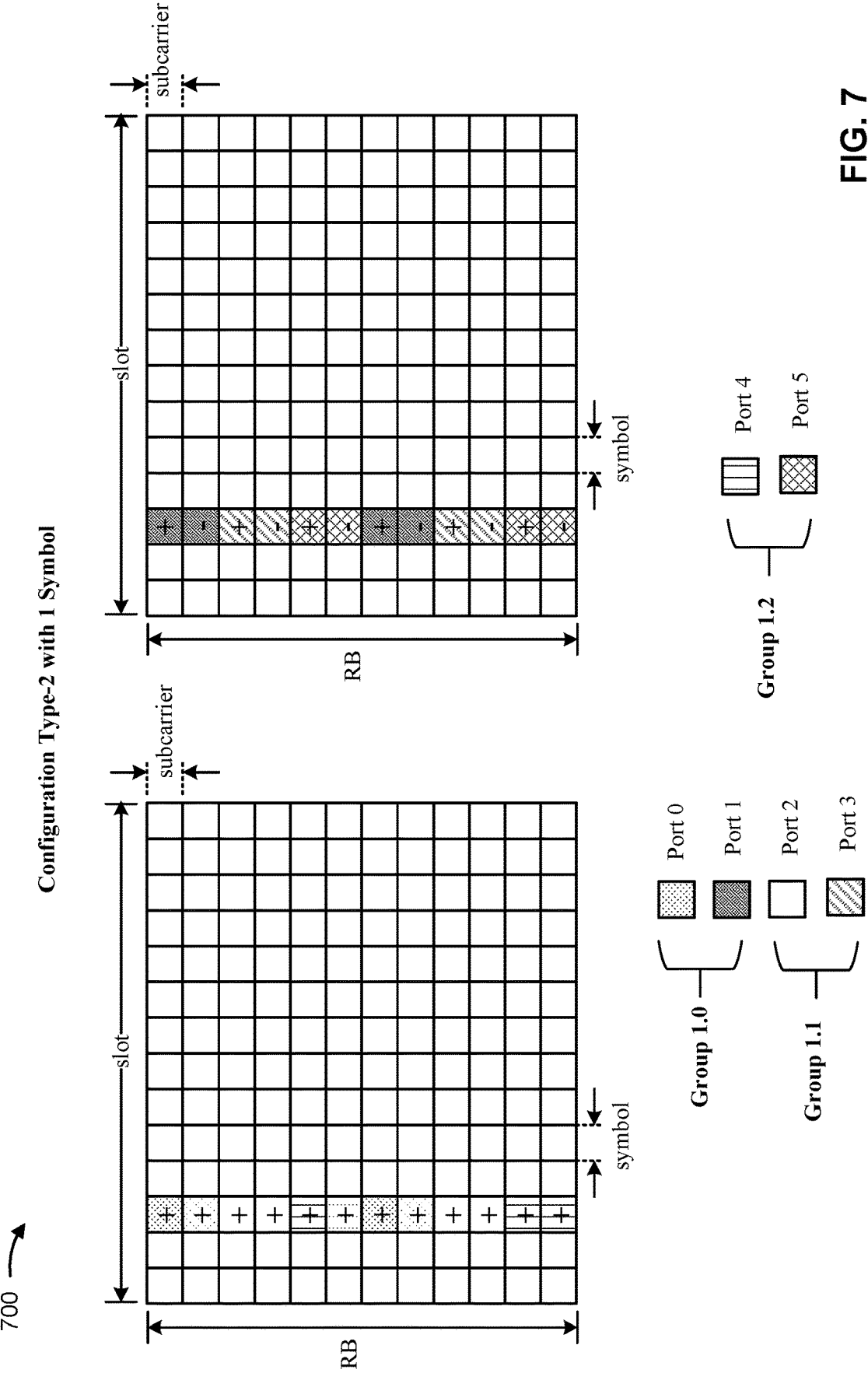
FIG. 7 is a diagram illustrating an example of DMRS configuration type-2 for one symbol, in accordance with the present disclosure.

FIG. 7 is a diagram illustrating an example 700 of DMRS configuration type-2 for one symbol, in accordance with the present disclosure. Rather than a two comb pattern, configuration type-2 uses a three offset frequency offset pattern in which DMRS for a particular port is transmitted in two consecutive resource elements in a symbol that alternates with two consecutive resource elements of two additional DMRS ports. The configuration type-2 pattern enables a pattern of 3 groups (such as Group 1.0, Group 1.1, and Group 1.2) of DMRS ports. The illustrated use of two FD-OCC of "+1 +1" and "+1 −1" enables DMRS for Port 1, Port 3, and Port 5 to be overlapped in time and frequency with the DMRS for Port 0, Port 2, and Port 4. Thus, up to six orthogonal DMRS ports may be supported by configuration type-2 DMRS using one symbol. Data may then be transmitted in the remaining symbols of the slot, such as in symbols 3 to 13 of the slot.

As indicated above, FIG. 7 is provided as an example. Other examples may differ from what is described with regard to FIG. 7.

Figure 8:
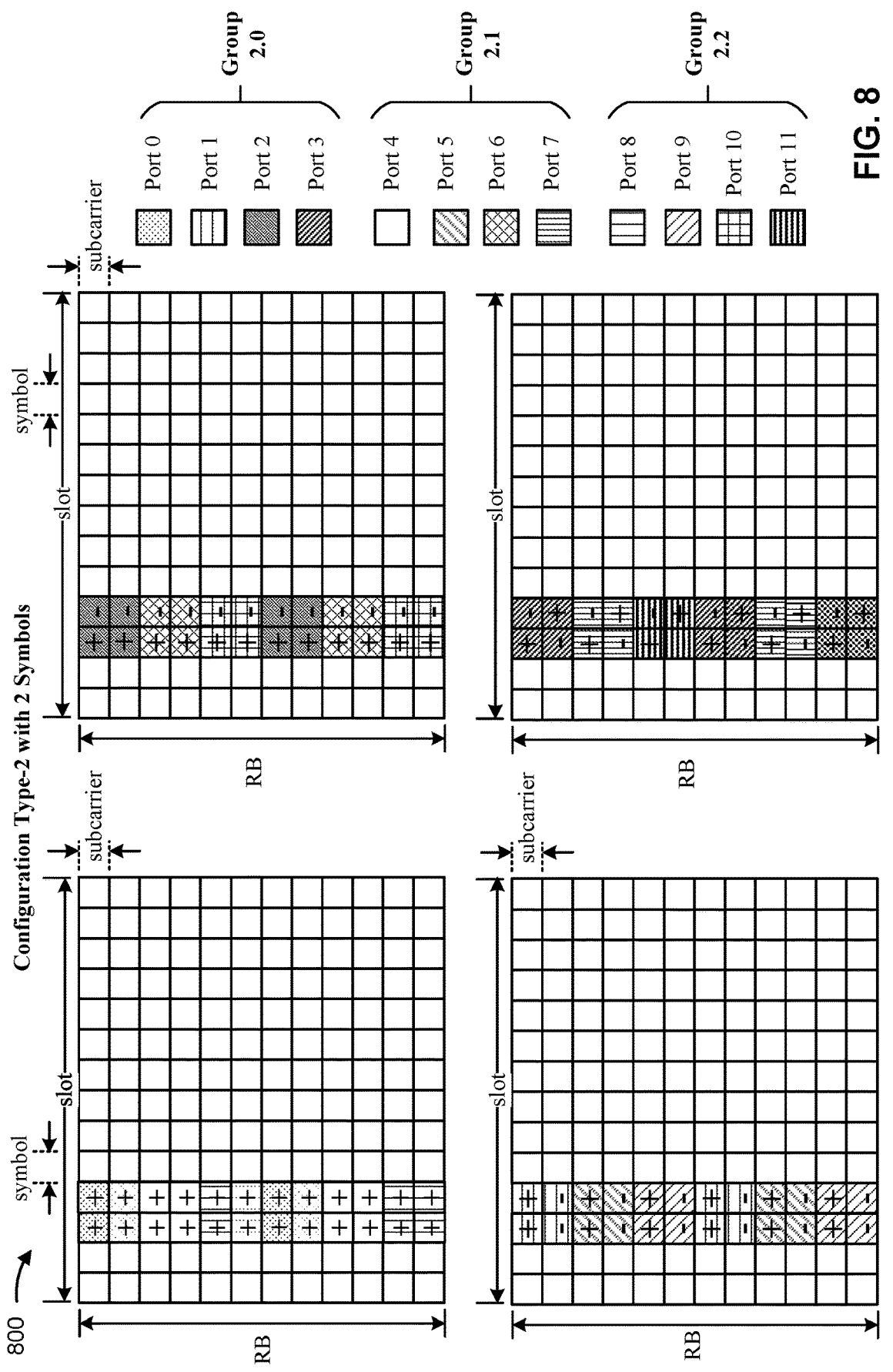
FIG. 8 is a diagram illustrating an example of DMRS configuration type-2 for two symbols, in accordance with the present disclosure.

FIG. 8 is a diagram illustrating an example 800 of DMRS configuration type-2 for two symbols, in accordance with the present disclosure. By adding an additional symbol of DMRS, the configuration type-2 supports up to twelve DMRS ports. In some cases, the second OFDM symbol enables the application of TD-OCC for the second symbol to double the number of supported ports for DMRS. Data may then be transmitted in the remaining symbols of the slot, such as in symbols 4 to 13 of the slot.

An increased number of downlink layers generally leads to an increased overhead for DMRS transmission. For a UE experiencing a medium level of Doppler effects, the network entity 405 may transmit two front loaded symbols of DMRS and two additional DMRS symbols within a slot to enable the UE 120 to track channel variations due to the Doppler effects. However, the use of four symbols for DMRS transmission for a slot consisting of fourteen symbols represents a significant amount of overhead to enable the UE to properly receive data. The reduced number of symbols of the slot that remain for data transmission results in a reduction of the spectral efficiency of the communication.

As indicated above, FIG. 8 is provided as an example. Other examples may differ from what is described with regard to FIG. 8.

Figure 9:
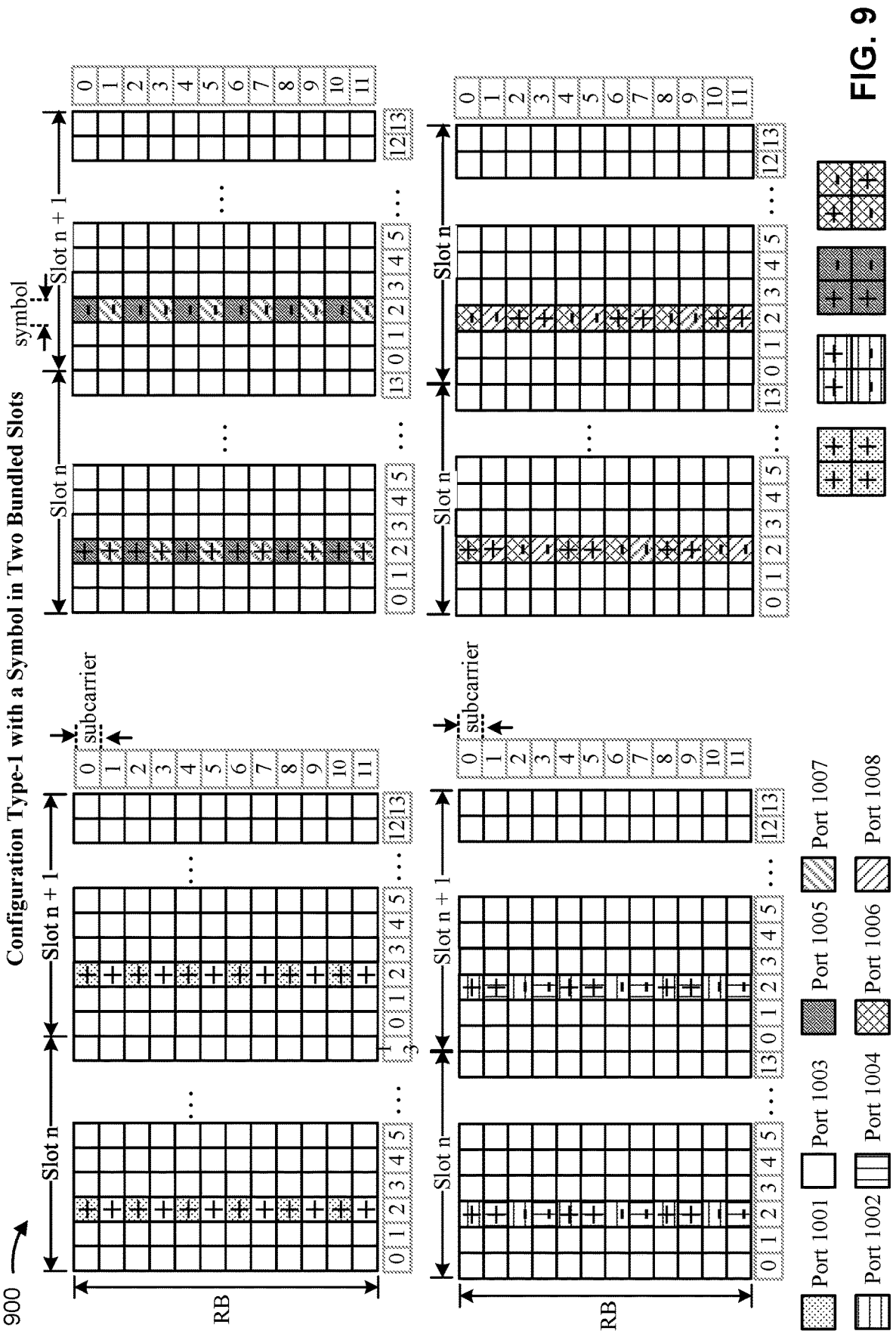
FIG. 9 is a diagram illustrating an example of DMRS configuration type-1 that includes DMRS bundling across consecutive slots, in accordance with the present disclosure.

FIG. 9 is a diagram illustrating an example 900 of DMRS configuration type-1 that includes DMRS bundling across consecutive slots, in accordance with the present disclosure. The example DMRS configuration supports up to eight orthogonal DMRS ports using a single symbol per slot. Data may then be transmitted in the remaining symbols of the slot. In some cases, the DMRS in symbol 2 of a first slot (slot n) may be bundled together with the DMRS in symbol 2 of a consecutive slot (slot n+1). DMRS bundling means that the DMRS can be used together by the UE 120 to estimate a channel. The UE 120 may combine the information for the DMRS in the consecutive slots to determine a channel estimation. By bundling the DMRS in the two slots together, the FD-OCC and TD-OCC codes can be applied to the combination of the two symbols for the consecutive slots. FIG. 9 includes a configuration type-1 pattern using a two comb pattern of alternating resource elements for different DMRS ports. A two comb pattern of Port 1001 from and Port 1003 uses a code of "+1 +1" in both the symbol of slot n and in the bundled symbol of slot n+1. A two comb pattern of port 1002 and Port 1004 uses a code of "+1 −1" in frequency for both the symbol in slot n and the symbol in slot n+1. A two comb pattern of Port 1005 and Port 1007 use a code of "+1 +1" in frequency for the symbol in slot n and a code of "−1 −1" in frequency for the symbol in slot n+1. A two comb pattern of Port 1006 and Port 1008 uses a code of "+1 −1" in the symbol of slot n and "−1 +1" in the symbol of slot n+1. The DMRS bundling across slots with the application of TD-OCC may support DMRS for up to eight orthogonal DMRS ports using one symbol per slot and may be good for communication that experiences low Doppler effects.

As indicated above, FIG. 9 is provided as an example. Other examples may differ from what is described with regard to FIG. 9.

Figure 10:
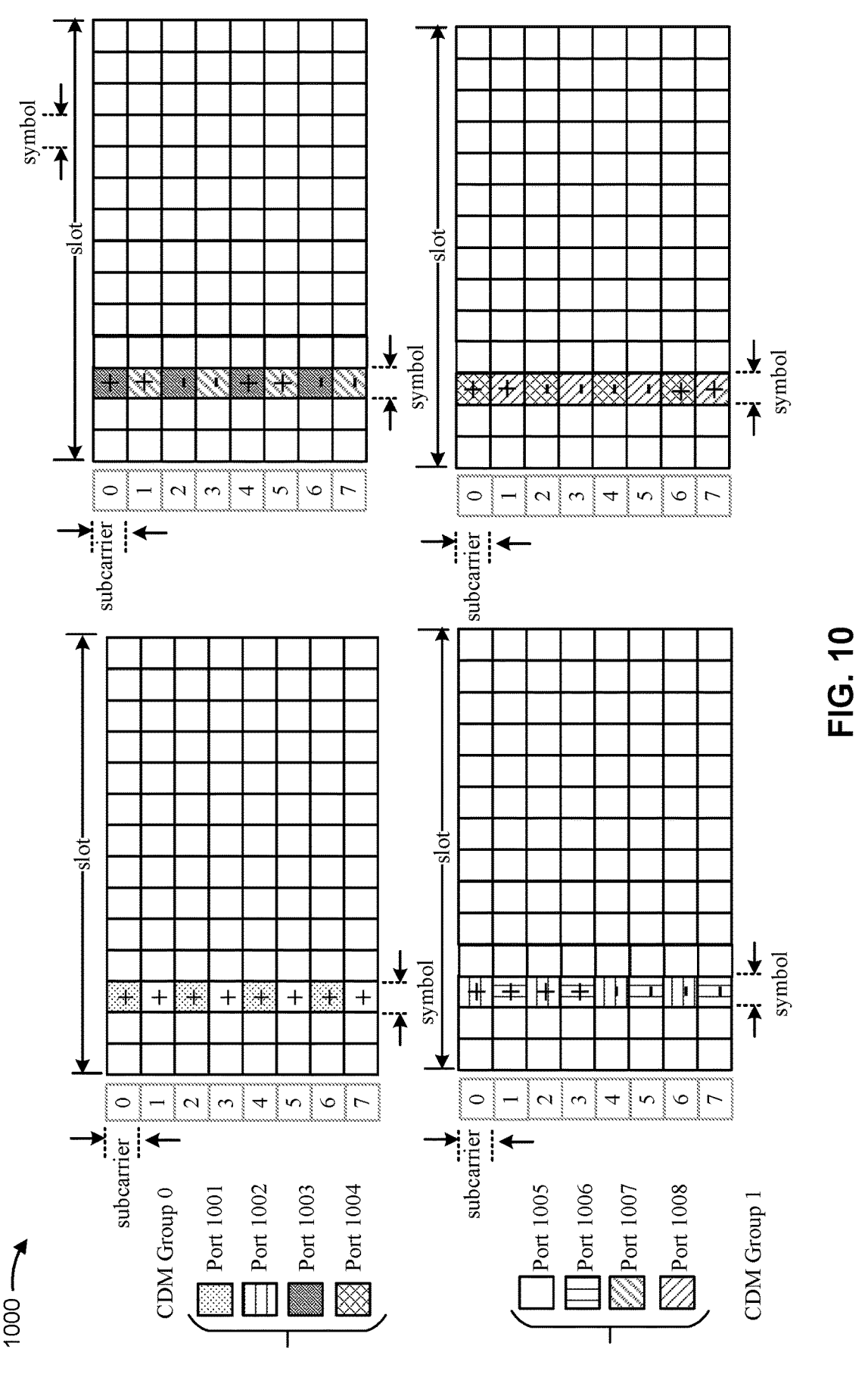
FIG. 10 is a diagram illustrating an example of DMRS configuration type-1 using a single symbol for a physical resource group of four resource blocks, in accordance with the present disclosure.

FIG. 10 is a diagram illustrating an example 1000 of a DMRS configuration type-1 using a single symbol for a PRB group (PRG) of four resource blocks, in accordance with the present disclosure. In some cases, the single symbol of DMRS is transmitted using only a single slot and supports up to eight orthogonal DMRS ports through the use of four FD-OCC and using the two comb frequency offset pattern described herein. Table 1 illustrates an example of four FD-OCC for four code division multiplexing (CDM) patterns. As illustrated in in the example 1001, Port 1001 and Port 1005 use a pattern of "+1 +1 +1 +1" in the frequency domain. Ports 1002 and 1006 use a pattern of "+1 +1 −1 −1" in the frequency domain. Ports 1003 and 1007 use a pattern of "+1 −1 +1 −1" in the frequency domain. Ports 1004 and 1008 use a pattern of "+1 −1 −1 +1" in the frequency domain. Accordingly, ports 1001, 1002, 1003, and 1004 may form a first CDM group (CDM group 0) and ports 1005. 1006, 1007, and 1008 may form a second CDM group (CDM group 1). Through the use of the four FD-OCC along with the two comb pattern, eight different DMRS ports may be supported using a single symbol of a single slot. In order to improve the processing gain for the DMRS, the DMRS may be applied for a PRG of two or more RBs. For example, the DMRS may be applied for a PRG of four RBs. The use of a PRG of two or more RBs may help to ensure the quality of the channel estimation that can be performed by the UE by increasing the number of resource elements using the four FD-OCC for a corresponding DMRS port.

TABLE 1

| CDM Pattern | [w_f(0) | w_f(1) | w_f(2) | w_f(3)] |
|---|---|---|---|---|
| 0 | [+1 | +1 | +1 | +1] |
| 1 | [+1 | +1 | −1 | −1] |
| 2 | [+1 | −1 | +1 | −1] |
| 3 | [+1 | −1 | −1 | +1] |

As indicated above, FIG. 10 is provided as an example. Other examples may differ from what is described with regard to FIG. 10.

Figure 11:
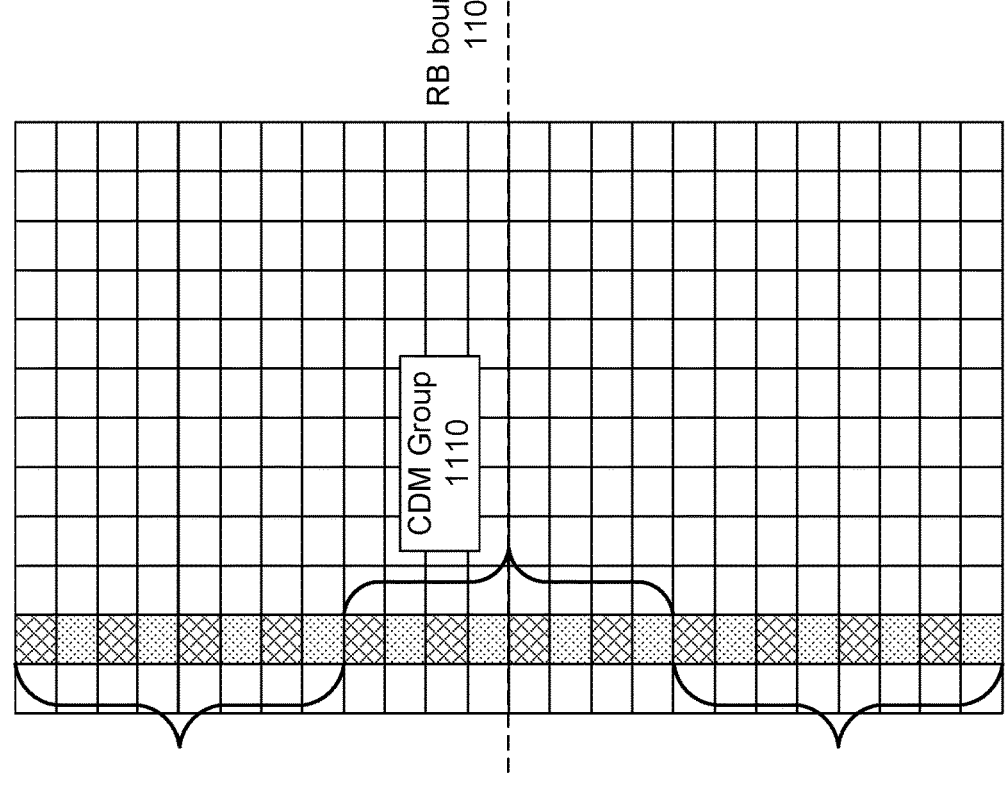
FIG. 11 is a diagram illustrating an example of virtual resource block to physical resource block interleaving, in accordance with the present disclosure.

FIG. 11 is a diagram illustrating an example 1100 of VRB-to-PRB interleaving, in accordance with the present disclosure.

In some cases, when DMRS configuration type-1 is used, the DMRS ports within one CDM group may span eight resource elements per resource block. When four FD-OCC is applied to the DMRS, the number of DMRS resource elements spanned by one CDM group may not be an integer number of four. When the PDSCH or PUSCH is scheduled with an odd number resource block allocation (e.g., single resource block), a resource block boundary 1105 spans only 12 REs which can't accommodate integer number of 8 REs for one CDM group. This will result into partial REs of one CDM group (e.g., CDM group 1110). In this example, it may not be possible for the DMRS ports to be orthogonal, thereby reducing frequency diversity.

In some cases when using VRB-to-PRB interleaving is enabled DMRS ports are mapped to physical RBs. An example VRB or PRB mapping 1115 may include sixteen virtual resources blocks. For example, the one or more virtual DMRS resources may be mapped to one or more physical resources of the PRB 1120 using VRB-to-PRB interleaving. However, when VRB-to-PRB interleaving is used, the virtual resources may not be mapped to the physical resources in a corresponding manner Some of the virtual DMRS resources may be mapped to a first portion (e.g., half) of the PRB 1120, and some of the virtual DMRS resources may be mapped to a second portion of the PRB 1120. For example, the first virtual DMRS resource may be mapped to a first physical resource portion 1125, while the third virtual DMRS resource may be mapped to a second physical resource portion 1130. This may be performed to increase frequency diversity among the physical resources.

In some aspects, when DMRS configuration type-1 is used, and when VRB-to-PRB interleaving is enabled, it may be possible that the PRBs are not contiguous in the frequency domain. As shown in the example 1100, the first physical resource portion 1125 may include four resource blocks, while the second physical resource portion 1130 may include three resource blocks. In this example (similar to the example above), it may not be possible for the DMRS ports to be orthogonal, thereby reducing frequency diversity.

Techniques and apparatuses are described herein for DMRS resource allocation. In some aspects, the UE 120 may transmit, to the network entity 405, DMRS capability information that indicates a number of orthogonal DMRS ports for DMRS communications. The network entity 405 may transmit, and the UE 120 may receive, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC. In some aspects, the UE 120 may transmit, and the network entity 405 may receive, information associated with a VRB-to-PRB mapping for a DMRS. The network entity 405 may transmit, and the UE 120 may receive, an indication to apply an FD-OCC to the DMRS for every three resource elements of the DMRS or every six resource elements of the DMRS.

As described above, when an odd number resource block allocation or VRB-to-PRB interleaving is used for DMRS configuration type-1, it may not be possible for all of the DMRS ports to be orthogonal. Using the techniques and apparatuses described herein, the UE 120 may be configured to restrict a resource allocation or a VRB-to-PRB mapping to increase DMRS port orthogonality. Thus, frequency diversity among the DMRS ports may be improved.

As indicated above, FIG. 11 is provided as an example. Other examples may differ from what is described with regard to FIG. 11.

FIG. 12 is a diagram illustrating an example 1200 of DMRS resource allocation, in accordance with the present disclosure.

As shown in connection with reference number 1205, the UE 120 may transmit, and the network entity 405 may receive, DMRS capability information. The DMRS capability information may indicate a number of orthogonal DMRS ports for DMRS communications. In some cases, for configuration type-1, the DMRS capability information may indicate that up to eight ports may be supported for a single symbol DMRS configuration, and that up to sixteen ports may be supported for a two-symbol DMRS configuration. In some cases, for configuration type-2, the DMRS capability information may indicate that up to twelve ports may be supported for a single symbol DMRS configuration, and that up to twenty-four ports may be supported for a two symbol DMRS configuration. For example, four FD-OCC may be applied to the DMRS to support the eight ports for type-1 single symbol DMRS, sixteen ports for type-1 two-symbol DMRS, twelve ports for type-2 single symbol DMRS, or twenty-four ports for type-2 two-symbol DMRS.

As shown in connection with reference number 1210, the network entity 405 may transmit, and the UE 120 may receive, information that is associated with a DMRS port mapping for the number of orthogonal DMRS ports.

In some aspects, the information that is associated with the DMRS port mapping for the number of orthogonal DMRS ports may indicate to restrict a resource allocation for a PDSCH or PUSCH associated with the number of orthogonal DMRS ports to an integer that is a multiple of two for each contiguous physical resource block. For example, when the network entity 405 schedules the PDSCH or PUSCH for the UE 120 with DMRS configuration type-1 and indicates an increased number of orthogonal ports (e.g., eight ports for type-1 single symbol DMRS or sixteen ports for type-1 two-symbol DMRS), the UE 120 may determine that the resource allocation should be an integer that is a multiple of two resource blocks. In some aspects, the network entity 405 may indicate (e.g., explicitly indicate) that the number of orthogonal DMRS ports is an integer that is a multiple of two resource blocks. In some aspects, the UE 120 may assume or otherwise determine that the number of orthogonal DMRS ports is an integer that is a multiple of two resource blocks.

In some aspects, the information that is associated with the DMRS port mapping for the number of orthogonal DMRS ports may indicate to restrict a VRB-to-PRB mapping for the number of orthogonal DMRS ports. In some aspects, the network entity 405 may transmit DCI to schedule the PUSCH or PDSCH for the UE 120. The DCI may indicate that DMRS configuration type-1 is used and may indicate an increased number of orthogonal ports (e.g., eight ports for type-1 single symbol DMRS or sixteen ports for type-1 two-symbol DMRS). In some aspects, a VRB-to-PRB mapping bitfield in the DCI may be zero or may not be indicated in the DCI. In this example, the PRBs may be non-interleaved. Additionally, or alternatively, the resource blocks may be contiguous in the physical domain. In some aspects, the UE 120 may determine that the number of VRB allocations is double the resource block bundle (RBB) size. For example, the UE 120 may assume that the number of VRB allocations is double the RBB size, or the network entity 405 may indicate that the number of VRB allocations is double the RBB size. In some aspects, the RBB size may be two resource blocks or four resource blocks.

As described above, when an odd number resource block allocation or VRB-to-PRB interleaving is used for DMRS configuration type-1, it may not be possible for all of the DMRS ports to be orthogonal. Using the techniques and apparatuses described herein, the UE 120 may be configured to restrict a resource allocation to increase DMRS port orthogonality. Thus, frequency diversity among the DMRS ports may be improved.

As indicated above, FIG. 12 is provided as an example. Other examples may differ from what is described with regard to FIG. 12.

Figure 13:
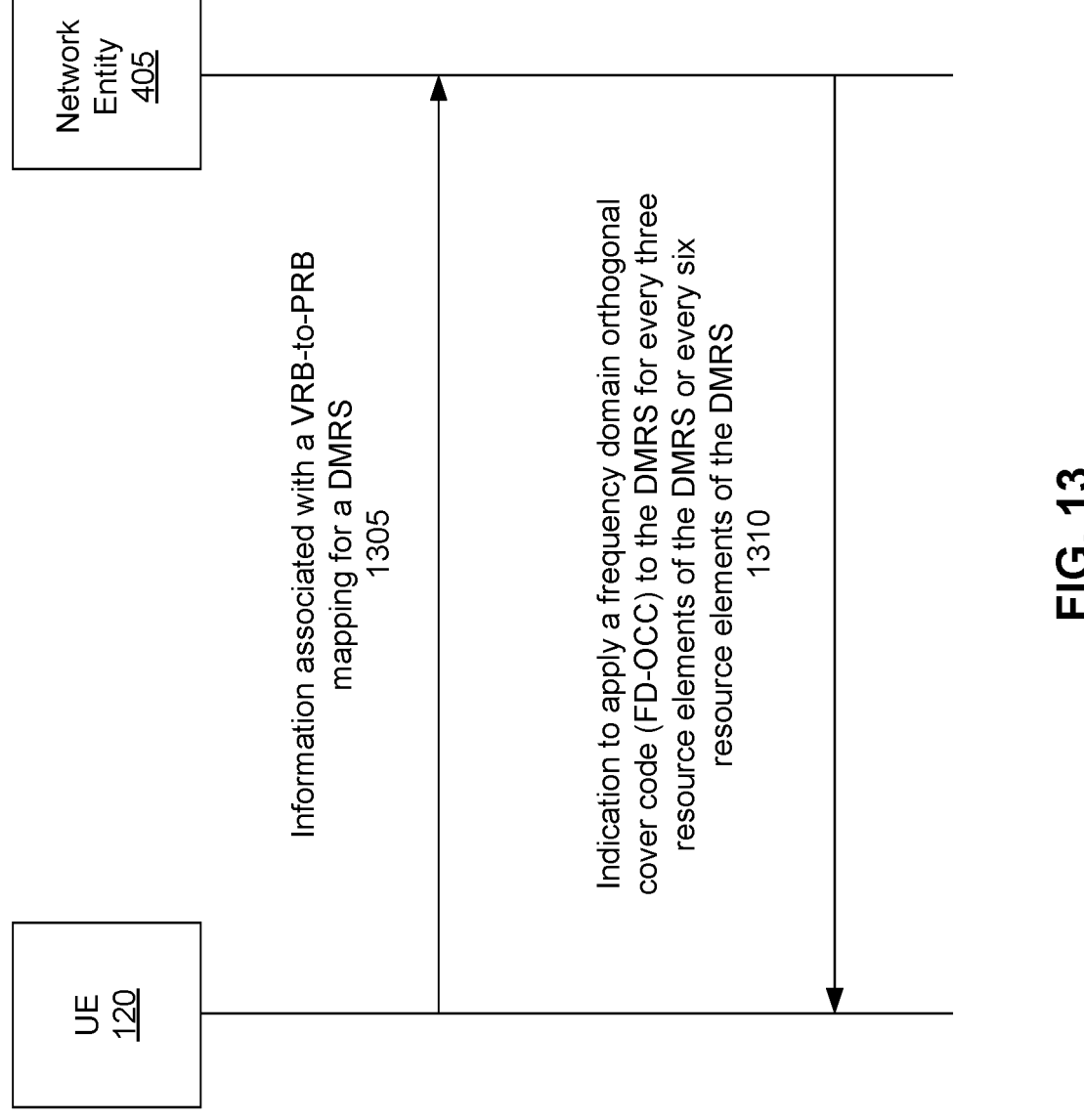
FIG. 13 is a diagram illustrating an example associated with DMRS resource allocation, in accordance with the present disclosure.

FIG. 13 is a diagram illustrating an example 1300 of DMRS resource allocation, in accordance with the present disclosure.

As shown in connection with reference number 1305, the UE 120 may transmit, and the network entity 405 may receive, information associated with a VRB-to-PRB mapping for a DMRS. In some aspects, the UE 120 may transmit an indication that VRB-to-PRB interleaving is being used for the DMRS port mapping. For example, the UE 120 may transmit an indication that some DMRS resources are being mapped to a first portion of the PRB and that other DMRS resources are being mapped to a second portion of the PRB.

As shown in connection with reference number 1310, the network entity 405 may transmit, and the UE 120 may receive, an indication to apply an FD-OCC to the DMRS for every three resource elements of the DMRS or every six resource elements of the DMRS.

In a first example, the network entity 405 may indicate to apply the FD-OCC to the DMRS for every three resource elements of a DMRS configuration type-1. For example, the network entity 405 may increase the code depth to three FD-OCC, or may indicate for the UE 120 to increase the code depth to three FD-OCC. This may enable up to six DMRS ports for a single symbol DMRS configuration type-1 and up to twelve DMRS ports for a two-symbol DMRS type-1 configuration. In some aspects, the expansion of the number of ports may be per CDM group to accommodate legacy UE multiplexing. For example, if the legacy UE is assigned one or more ports for a certain CDM group, then it may not be possible to assign other extended ports to that CDM group. In some aspects, the two FD-OCC may be indicated by the following matrix, where the columns correspond to resource elements and the rows correspond to DMRS ports:

$$\begin{bmatrix} +1 & +1 \\ +1 & -1 \end{bmatrix}$$

In contrast, the three FD-OCC may be indicated by the following matrix:

$$\begin{bmatrix} 1 & 1 & 1 \\ 1 & -0.5 - \dfrac{j\sqrt{3}}{2} & -0.5 + \dfrac{j\sqrt{3}}{2} \\ 1 & -0.5 + \dfrac{j\sqrt{3}}{2} & -0.5 - \dfrac{j\sqrt{3}}{2} \end{bmatrix}$$

In a second example, the network entity 405 may indicate to apply the FD-OCC to the DMRS for every six resource elements of a DMRS configuration type-1. For example, the network entity 405 may increase the code depth to six FD-OCC, or may indicate for the UE 120 to increase the code depth to six FD-OCC. This may enable up to twelve DMRS ports for a single symbol DMRS configuration type-1 and up to twenty-four ports for a two-symbol DMRS type-1 configuration. In this example, only one of the two legacy ports may be allowed to be multiplexed with the new orthogonal ports. In some aspects, the six FD-OCC may be indicated by the following matrix:

| 1.0000 | 1.0000 + 0.0000i | 1.0000 + 0.0000i | 1.0000 + 0.0000i | 1.0000 + 0.0000i | 1.0000 + 0.0000i |
|--------|------------------|------------------|------------------|------------------|------------------|
| 1.0000 | 0.5000 − 0.8660i | −0.5000 − 0.8660i | −1.0000 + 0.0000i | −0.5000 + 0.8660i | 0.5000 + 0.8660i |
| 1.0000 | −0.5000 − 0.8660i | −0.5000 + 0.8660i | 1.0000 + 0.0000i | −0.5000 − 0.8660i | −0.5000 + 0.8660i |
| 1.0000 | −1.0000 + 0.0000i | 1.0000 + 0.0000i | −1.0000 + 0.0000i | 1.0000 + 0.0000i | −1.0000 + 0.0000i |
| 1.0000 | −0.5000 + 0.8660i | −0.5000 − 0.8660i | 1.0000 + 0.0000i | −0.5000 + 0.8660i | −0.5000 − 0.8660i |
| 1.0000 | 0.5000 + 0.8660i | −0.5000 + 0.8660i | −1.0000 + 0.0000i | −0.5000 − 0.8660i | 0.5000 − 0.8660i |

As described above, when an odd number resource block allocation or VRB-to-PRB interleaving is used for DMRS configuration type-1, it may not be possible for all of the DMRS ports to be orthogonal. Using the techniques and apparatuses described herein, the UE 120 may be configured to restrict a VRB-to-PRB mapping to increase DMRS port orthogonality. Thus, frequency diversity among the DMRS ports may be improved.

As indicated above, FIG. 13 is provided as an example. Other examples may differ from what is described with regard to FIG. 13.

FIG. 14 is a diagram illustrating an example 1400 of DMRS multiplexing, in accordance with the present disclosure. In some aspects, twelve resource elements 1405 may be numbered consecutively as resources 0-11. A first CDM group 1410 may use two FD-OCC. The UEs in the first CDM group 1410 may be assigned one or more legacy UE ports. For example, the UEs in the first CDM group 1410 may be assigned two ports with (1,1) and (1, −1) FD-OCC that occurs every two resource elements. A second CDM group 1415 may use six FD-OCC. For example, the UEs in the second CDM group 1415 may use six ports with six FD-OCC that occurs every six resource elements. In some aspects, the UE 120 having legacy (e.g., Release 15) DMRS ports may not expect that a multi-user UE 120 with the DMRS ports described herein to be in the same CDM group.

As indicated above, FIG. 14 is provided as an example. Other examples may differ from what is described with regard to FIG. 14.

FIG. 15 is a diagram illustrating an example process 1500 performed, for example, by a UE, in accordance with the present disclosure. Example process 1500 is an example where the UE (e.g., UE 120) performs operations associated with DMRS resource allocation.

As shown in FIG. 15, in some aspects, process 1500 may include transmitting, to a network entity, DMRS capability information that indicates a number of orthogonal DMRS ports for DMRS communications (block 1510). For example, the UE (e.g., using communication manager 140 and/or transmission component 1704, depicted in FIG. 17) may transmit, to a network entity, DMRS capability information that indicates a number of orthogonal DMRS ports for DMRS communications, as described above.

As further shown in FIG. 15, in some aspects, process 1500 may include receiving, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC (block 1520). For example, the UE (e.g., using communication manager 140 and/or reception component 1702, depicted in FIG. 17) may receive, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC, as described above.

Process 1500 may include additional aspects, such as any single aspect or any combination of aspects described below and/or in connection with one or more other processes described elsewhere herein.

In a first aspect, the first number of DMRS ports is a legacy number of DMRS ports, the second number of DMRS ports is an extended number of DMRS ports, and the UE is a multi-user UE.

In a second aspect, alone or in combination with the first aspect, the DMRS capability information is associated with a DMRS configuration type that uses every other resource element within one or more symbols allocated to the DMRS.

In a third aspect, alone or in combination with one or more of the first and second aspects, the number of orthogonal DMRS ports is eight ports for a single symbol DMRS for the DMRS configuration type or sixteen ports for a two symbol DMRS for the DMRS configuration type.

In a fourth aspect, alone or in combination with one or more of the first through third aspects, the information that indicates to restrict the VRB-to-PRB mapping for the number of orthogonal DMRS ports is included in a VRB-to-PRB mapping bitfield of DCI.

In a fifth aspect, alone or in combination with one or more of the first through fourth aspects, a value of the VRB-to-PRB mapping bitfield is zero or is not included in the DCI.

In a sixth aspect, alone or in combination with one or more of the first through fifth aspects, the information that indicates to restrict the VRB-to-PRB mapping for the number of orthogonal DMRS ports indicates that a plurality of PRBs associated with the number of orthogonal DMRS ports are non-interleaved or that the plurality of PRBs associated with the number of orthogonal DMRS ports are contiguous in a physical domain.

In a seventh aspect, alone or in combination with one or more of the first through sixth aspects, the information that indicates to restrict the VRB-to-PRB mapping for the number of orthogonal DMRS ports indicates that a number of VRB allocations is double a resource block bundle size.

In an eighth aspect, alone or in combination with one or more of the first through seventh aspects, the resource block bundle size is two resource blocks or four resource blocks.

In a ninth aspect, alone or in combination with one or more of the first through eighth aspects, receiving the information that is associated with the DMRS port mapping comprises receiving a PDSCH resource allocation that includes the information or a PUSCH resource allocation that includes the information.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a UE, in accordance with the present disclosure. Example process 1600 is an example where the UE (e.g., UE 120) performs operations associated with DMRS resource allocation.

As shown in FIG. 16, in some aspects, process 1600 may include transmitting, to a network entity, information associated with a VRB-to-PRB mapping for a DMRS (block 1610). For example, the UE (e.g., using communication manager 140 and/or transmission component 1704, depicted in FIG. 17) may transmit, to a network entity, information associated with a VRB-to-PRB mapping for a DMRS, as described above.

As further shown in FIG. 16, in some aspects, process 1600 may include receiving, from the network entity, an indication to apply a FD-OCC to the DMRS for every three resource elements of the DMRS or every six resource elements of the DMRS (block 1620). For example, the UE (e.g., using communication manager 140 and/or reception component 1702, depicted in FIG. 17) may receive, from the network entity, an indication to apply a FD-OCC to the DMRS for every three resource elements of the DMRS or every six resource elements of the DMRS, as described above.

Process 1600 may include additional aspects, such as any single aspect or any combination of aspects described below and/or in connection with one or more other processes described elsewhere herein.

In a first aspect, the indication indicates to apply the FD-OCC to the DMRS for every three resource elements of the DMRS for a DMRS configuration type that uses every other resource element within one or more symbols allocated to the DMRS.

In a second aspect, alone or in combination with the first aspect, the DMRS configuration type supports six ports for a single symbol DMRS and twelve ports for a two symbol DMRS.

In a third aspect, alone or in combination with one or more of the first and second aspects, the six ports or the twelve ports are included in a code division multiplexing group.

In a fourth aspect, alone or in combination with one or more of the first through third aspects, the indication indicates to apply the FD-OCC to the DMRS for every six resource elements of the DMRS for a DMRS configuration type that uses every other resource element within one or more symbols allocated to the DMRS.

In a fifth aspect, alone or in combination with one or more of the first through fourth aspects, the DMRS configuration type supports twelve ports for a single symbol DMRS and twenty-four ports for a two symbol DMRS.

In a sixth aspect, alone or in combination with one or more of the first through fifth aspects, the information indicates that VRB-to-PRB interleaving is enabled, and wherein applying the FD-OCC to the DMRS enables each PRB of a plurality of PRBs associated with the DMRS to be contiguous in a frequency domain.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
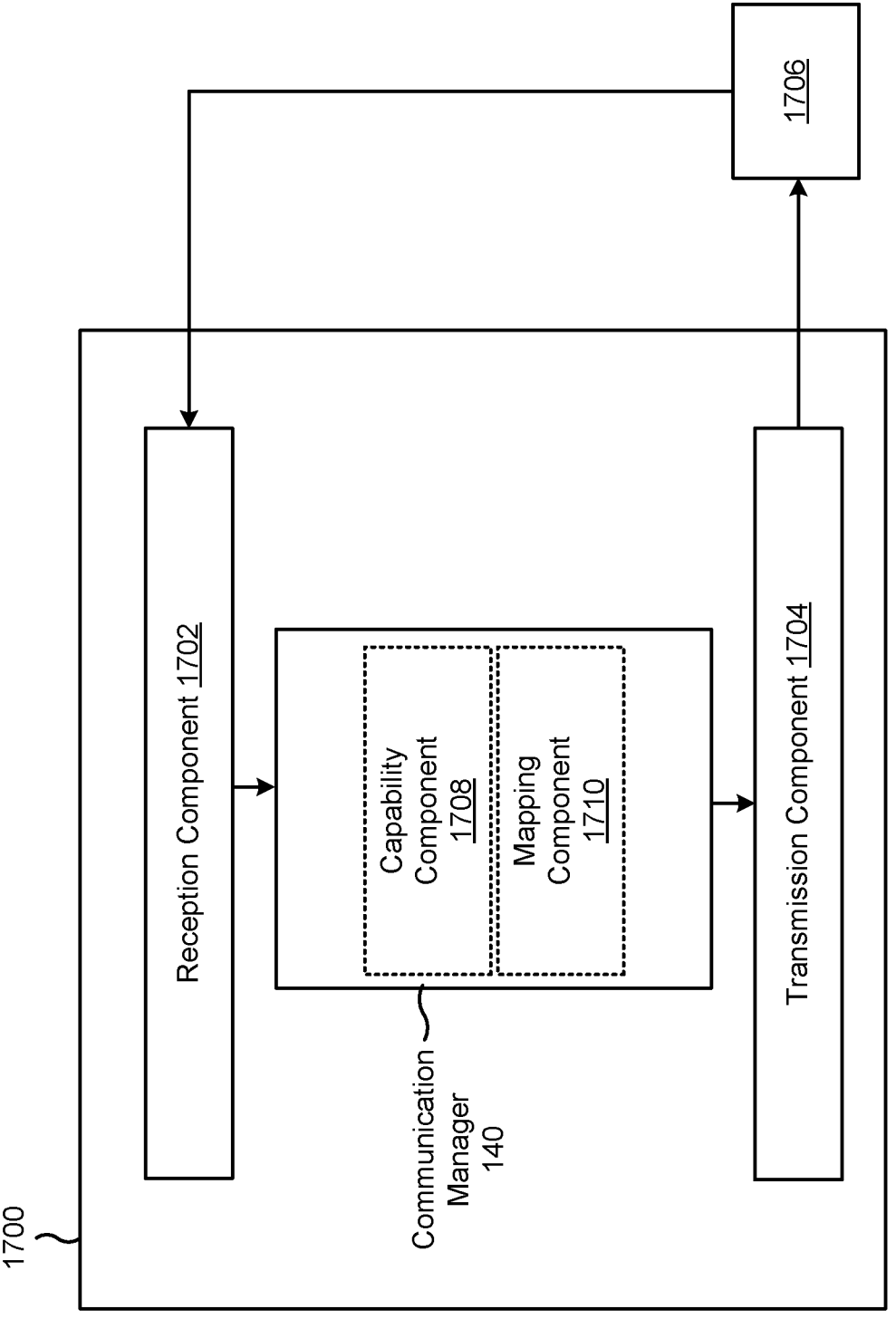
FIG. 17 is a diagram of an example apparatus for wireless communication, in accordance with the present disclosure.

FIG. 17 is a diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include one or more of a capability component 1708 or a mapping component 1710, among other examples.

In some aspects, the apparatus 1700 may be configured to perform one or more operations described herein in connection with FIGS. 12-14. Additionally, or alternatively, the apparatus 1700 may be configured to perform one or more processes described herein, such as process 1500 of FIG. 15, process 1600 of FIG. 16, or a combination thereof. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The transmission component 1704 and/or the capability component 1708 may transmit, to a network entity, DMRS capability information that indicates a number of orthogonal DMRS ports for DMRS communications. The reception component 1702 may receive, from the network entity, information that is associated with a DMRS port mapping for the number of orthogonal DMRS ports and that indicates to restrict a resource allocation for a PDSCH or PUSCH associated with the number of orthogonal DMRS ports to an integer that is a multiple of two for each contiguous physical resource block, to restrict a VRB-to-PRB mapping for the number of orthogonal DMRS ports, or to restrict the number of orthogonal DMRS ports such that a first number of DMRS ports and a second number of DMRS ports are not multiplexed in a same CDM group, wherein the first number of DMRS ports is based at least in part on a length two FD-OCC and the second number of DMRS ports is based at least in part on a length four FD-OCC.

The transmission component 1704 and/or the mapping component 1710 may transmit, to a network entity, information associated with a VRB-to-PRB mapping for a DMRS. The reception component 1702 may receive, from the network entity, an indication to apply a FD-OCC to the DMRS for every three resource elements of the DMRS or every six resource elements of the DMRS.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: transmitting, to a network entity, demodulation reference signal (DMRS) capability information that indicates a number of orthogonal DMRS ports for DMRS communications; and receiving, from the network entity, information that is associated with a DMRS port mapping for the number of orthogonal DMRS ports and that indicates to restrict a resource allocation for a physical downlink shared channel (PDSCH) or physical uplink shared channel (PUSCH) associated with the number of orthogonal DMRS ports to an integer that is a multiple of two for each contiguous physical resource block, to restrict a virtual resource block to physical resource block (VRB-to-PRB) mapping for the number of orthogonal DMRS ports, or to restrict the number of orthogonal DMRS ports such that a first number of DMRS ports and a second number of DMRS ports are not multiplexed in a same code division multiplexing (CDM) group, wherein the first number of DMRS ports is based at least in part on a length two frequency domain orthogonal cover code (FD-OCC) and the second number of DMRS ports is based at least in part on a length four FD-OCC.

Aspect 2: The method of Aspect 1, wherein the first number of DMRS ports is a legacy number of DMRS ports, the second number of DMRS ports is an extended number of DMRS ports, and the UE is a multi-user UE.

Aspect 3: The method of Aspect 1, wherein the DMRS capability information is associated with a DMRS configuration type that uses every other resource element within one or more symbols allocated to the DMRS.

Aspect 4: The method of Aspect 3, wherein the number of orthogonal DMRS ports is eight ports for a single symbol DMRS for the DMRS configuration type or sixteen ports for a two symbol DMRS for the DMRS configuration type.

Aspect 5: The method of any of Aspects 1-4, wherein the information that indicates to restrict the VRB-to-PRB mapping for the number of orthogonal DMRS ports is included in a VRB-to-PRB mapping bitfield of downlink control information (DCI).

Aspect 6: The method of Aspect 5, wherein a value of the VRB-to-PRB mapping bitfield is zero or is not included in the DCI.

Aspect 7: The method of Aspect 5, wherein the information that indicates to restrict the VRB-to-PRB mapping for the number of orthogonal DMRS ports indicates that a plurality of PRBs associated with the number of orthogonal DMRS ports are non-interleaved or that the plurality of PRBs associated with the number of orthogonal DMRS ports are contiguous in a physical domain.

Aspect 8: The method of any of Aspects 1-7, wherein the information that indicates to restrict the VRB-to-PRB mapping for the number of orthogonal DMRS ports indicates that a number of VRB allocations is double a resource block bundle size.

Aspect 9: The method of Aspect 8, wherein the resource block bundle size is two resource blocks or four resource blocks.

Aspect 10: The method of any of Aspects 1-9, wherein receiving the information that is associated with the DMRS port mapping comprises receiving a PDSCH resource allocation that includes the information or a PUSCH resource allocation that includes the information.

Aspect 11: A method of wireless communication performed by a user equipment (UE), comprising: transmitting, to a network entity, information associated with a virtual resource block to physical resource block (VRB-to-PRB) mapping for a demodulation reference signal (DMRS); and receiving, from the network entity, an indication to apply a frequency domain orthogonal cover code (FD-OCC) to the DMRS for every three resource elements of the DMRS or every six resource elements of the DMRS.

Aspect 12: The method of Aspect 11, wherein the indication indicates to apply the FD-OCC to the DMRS for every three resource elements of the DMRS for a DMRS configuration type that uses every other resource element within one or more symbols allocated to the DMRS.

Aspect 13: The method of Aspect 12, wherein the DMRS configuration type supports six ports for a single symbol DMRS and twelve ports for a two symbol DMRS, wherein the six ports or the twelve ports are included in a code division multiplexing group.

Aspect 14: The method of any of Aspects 11-13, wherein the indication indicates to apply the FD-OCC to the DMRS for every six resource elements of the DMRS for a DMRS configuration type that uses every other resource element within one or more symbols allocated to the DMRS.

Aspect 15: The method of Aspect 14, wherein the DMRS configuration type supports twelve ports for a single symbol DMRS and twenty-four ports for a two symbol DMRS.

Aspect 16: The method of any of Aspects 11-15, wherein the information indicates that VRB-to-PRB interleaving is enabled, and wherein applying the FD-OCC to the DMRS enables each PRB of a plurality of PRBs associated with the DMRS to be contiguous in a frequency domain.

Aspect 17: An apparatus for wireless communication at a device, comprising a processor; memory coupled with the processor; and instructions stored in the memory and executable by the processor to cause the apparatus to perform the method of one or more of Aspects 1-10.

Aspect 18: A device for wireless communication, comprising a memory and one or more processors coupled to the memory, the one or more processors configured to perform the method of one or more of Aspects 1-10.

Aspect 19: An apparatus for wireless communication, comprising at least one means for performing the method of one or more of Aspects 1-10.

Aspect 20: A non-transitory computer-readable medium storing code for wireless communication, the code comprising instructions executable by a processor to perform the method of one or more of Aspects 1-10.

Aspect 21: A non-transitory computer-readable medium storing a set of instructions for wireless communication, the set of instructions comprising one or more instructions that, when executed by one or more processors of a device, cause the device to perform the method of one or more of Aspects 1-10.

Aspect 22: An apparatus for wireless communication at a device, comprising a processor; memory coupled with the processor; and instructions stored in the memory and executable by the processor to cause the apparatus to perform the method of one or more of Aspects 11-16.

Aspect 23: A device for wireless communication, comprising a memory and one or more processors coupled to the memory, the one or more processors configured to perform the method of one or more of Aspects 11-16.

Aspect 24: An apparatus for wireless communication, comprising at least one means for performing the method of one or more of Aspects 11-16.

Aspect 25: A non-transitory computer-readable medium storing code for wireless communication, the code comprising instructions executable by a processor to perform the method of one or more of Aspects 11-16.

Aspect 26: A non-transitory computer-readable medium storing a set of instructions for wireless communication, the set of instructions comprising one or more instructions that, when executed by one or more processors of a device, cause the device to perform the method of one or more of Aspects 11-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

33

What is claimed is:

1. An apparatus for wireless communication at a user equipment (UE), comprising:
one or more memories; and
one or more processors, coupled to the one or more memories, configured to:
transmit, to a network entity, demodulation reference signal (DMRS) capability information that indicates a number of orthogonal DMRS ports for DMRS communications; and
receive, from the network entity, information that is associated with a DMRS port mapping for the number of orthogonal DMRS ports and that indicates to:
restrict a resource allocation for a physical downlink shared channel (PDSCH) or physical uplink shared channel (PUSCH) associated with the number of orthogonal DMRS ports to an integer that is a multiple of two for each contiguous physical resource block;
restrict a virtual resource block to physical resource block (VRB-to-PRB) mapping for the number of orthogonal DMRS ports; or
restrict the number of orthogonal DMRS ports, wherein a first number of DMRS ports and a second number of DMRS ports are not multiplexed in a same code division multiplexing (CDM) group, the first number of DMRS ports being based at least in part on a length two frequency domain orthogonal cover code (FD-OCC) and the second number of DMRS ports being based at least in part on a length four FD-OCC.

2. The apparatus of claim 1, wherein the first number of DMRS ports is a legacy number of DMRS ports, the second number of DMRS ports is an extended number of DMRS ports, and the UE is a multi-user UE.

3. The apparatus of claim 1, wherein the DMRS capability information is associated with a DMRS configuration type that uses every other resource element within one or more symbols allocated to the DMRS.

4. The apparatus of claim 3, wherein the number of orthogonal DMRS ports is eight ports for a single symbol DMRS for the DMRS configuration type or sixteen ports for a two symbol DMRS for the DMRS configuration type.

5. The apparatus of claim 1, wherein the information that indicates to restrict the VRB-to-PRB mapping for the number of orthogonal DMRS ports is included in a VRB-to-PRB mapping bitfield of downlink control information (DCI).

6. The apparatus of claim 5, wherein a value of the VRB-to-PRB mapping bitfield is zero or is not included in the DCI.

7. The apparatus of claim 5, wherein the information that indicates to restrict the VRB-to-PRB mapping for the number of orthogonal DMRS ports indicates that a plurality of PRBs associated with the number of orthogonal DMRS ports are non-interleaved or that the plurality of PRBs associated with the number of orthogonal DMRS ports are contiguous in a physical domain.

8. The apparatus of claim 1, wherein the information that indicates to restrict the VRB-to-PRB mapping for the number of orthogonal DMRS ports indicates that a number of VRB allocations is double a resource block bundle size.

9. The apparatus of claim 8, wherein the resource block bundle size is two resource blocks or four resource blocks.

10. The apparatus of claim 1, wherein the one or more processors, to receive the information that is associated with the DMRS port mapping, are configured to receive a PDSCH resource allocation that includes the information or a PUSCH resource allocation that includes the information.

11. The apparatus of claim 1, wherein the one or more processors are further configured to restrict resource allocation by scheduling PRBs for a PDSCH or PUSCH as contiguous PRBs in the frequency domain.

12. The apparatus of claim 1, wherein the one or more processors are further configured to determine the number of DMRS ports based on DMRS capability information transmitted by the UE.

13. The apparatus of claim 1, wherein the one or more processors are further configured to restrict allocation by performing a mapping between VRBs and PRBs according to an indication received from the network entity.

14. The apparatus of claim 1, wherein the one or more processors are further configured to, in response to receiving the information associated with the DMRS port mapping, apply a scheduling restriction that prevents assignment of DMRS ports based at least in part on a length two FD-OCC and DMRS ports based at least in part on a length four FD-OCC to the same CDM group.

15. A method of wireless communication performed by a user equipment (UE), comprising:
transmitting, to a network entity, demodulation reference signal (DMRS) capability information that indicates a number of orthogonal DMRS ports for DMRS communications; and
receiving, from the network entity, information that is associated with a DMRS port mapping for the number of orthogonal DMRS ports and that indicates to:
restrict a resource allocation for a physical downlink shared channel (PDSCH) or physical uplink shared channel (PUSCH) associated with the number of orthogonal DMRS ports to an integer that is a multiple of two for each contiguous physical resource block;
restrict a virtual resource block to physical resource block (VRB-to-PRB) mapping for the number of orthogonal DMRS ports; or
restrict the number of orthogonal DMRS ports, wherein a first number of DMRS ports and a second number of DMRS ports are not multiplexed in a same code division multiplexing (CDM) group, the first number of DMRS ports being based at least in part on a length two frequency domain orthogonal cover code (FD-OCC) and the second number of DMRS ports being based at least in part on a length four FD-OCC.

16. The method of claim 15, wherein the first number of DMRS ports is a legacy number of DMRS ports, the second number of DMRS ports is an extended number of DMRS ports, and the UE is a multi-user UE.

17. The method of claim 15, wherein the DMRS capability information is associated with a DMRS configuration type that uses every other resource element within one or more symbols allocated to the DMRS.

18. The method of claim 15, wherein the information that indicates to restrict the VRB-to-PRB mapping for the number of orthogonal DMRS ports is included in a VRB-to-PRB mapping bitfield of downlink control information (DCI).

19. The method of claim 18, wherein a value of the VRB-to-PRB mapping bitfield is zero or is not included in the DCI.

20. The method of claim 18, wherein the information that indicates to restrict the VRB-to-PRB mapping for the number of orthogonal DMRS ports indicates that a plurality of PRBs associated with the number of orthogonal DMRS ports are non-interleaved or that the plurality of PRBs associated with the number of orthogonal DMRS ports are contiguous in a physical domain.

21. The method of claim 15, wherein the information that indicates to restrict the VRB-to-PRB mapping for the number of orthogonal DMRS ports indicates that a number of VRB allocations is double a resource block bundle size.

22. The method of claim 15, further comprising: receiving, from the network entity, an indication that the resource allocation for DMRS ports is to be an integer multiple of two resource blocks.

23. The method of claim 15, further comprising: transmitting, to the network entity, DMRS capability information indicating a number of orthogonal DMRS ports supported by the UE.

24. The method of claim 15, further comprising:

applying a scheduling restriction to prevent DMRS ports associated with legacy DMRS configurations from being scheduled with DMRS ports associated with enhanced DMRS configurations in a same CDM group.

25. The method of claim 15, further comprising receiving, from the network entity, an indication to apply the FD-OCC to the DMRS for every three resource elements of the DMRS or every six resource elements of the DMRS.

26. The method of claim 15, further comprising restricting a scheduling of the number of orthogonal DMRS ports for multi-user MIMO by assigning different UEs to distinct CDM groups.

27. A non-transitory computer-readable medium storing a set of instructions for wireless communication, the set of instructions comprising:

one or more instructions that, when executed by one or more processors of a user equipment (UE), cause the UE to:

transmit, to a network entity, demodulation reference signal (DMRS) capability information that indicates a number of orthogonal DMRS ports for DMRS communications; and receive, from the network entity, information that is associated with a DMRS port mapping for the number of orthogonal DMRS ports and that indicates to:

restrict a resource allocation for a physical downlink shared channel (PDSCH) or physical uplink shared channel (PUSCH) associated with the number of orthogonal DMRS ports to an integer that is a multiple of two for each contiguous physical resource block;

restrict a virtual resource block to physical resource block (VRB-to-PRB) mapping for the number of orthogonal DMRS ports; or restrict the number of orthogonal DMRS ports, wherein a first number of DMRS ports and a second number of DMRS ports are not multiplexed in a same code division multiplexing (CDM) group, the first number of DMRS ports being based at least in part on a length two frequency domain orthogonal cover code (FD-OCC) and the second number of DMRS ports being based at least in part on a length four FD-OCC.

28. The non-transitory computer-readable medium of claim 27, wherein the instructions further cause the UE to restrict resource allocation to cause scheduled PRBs for a PDSCH or PUSCH to be contiguous in the frequency domain.

29. The non-transitory computer-readable medium of claim 27, wherein the instructions further cause the UE to determine the number of DMRS ports based on DMRS capability information transmitted by the user equipment.

30. An apparatus for wireless communication, comprising:

means for transmitting demodulation reference signal (DMRS) capability information that indicates a number of orthogonal DMRS ports for DMRS communications; and means for receiving information that is associated with a DMRS port mapping for the number of orthogonal DMRS ports and that indicates to:

restrict a resource allocation for a physical downlink shared channel (PDSCH) or physical uplink shared channel (PUSCH) associated with the number of orthogonal DMRS ports to an integer that is a multiple of two for each contiguous physical resource block;

restrict a virtual resource block to physical resource block (VRB-to-PRB) mapping for the number of orthogonal DMRS ports; or restrict the number of orthogonal DMRS ports, wherein a first number of DMRS ports and a second number of DMRS ports are not multiplexed in a same code division multiplexing (CDM) group, the first number of DMRS ports being based at least in part on a length two frequency domain orthogonal cover code (FD-OCC) and the second number of DMRS ports being based at least in part on a length four FD-OCC.

* * * * *